(12) United States Patent
Nakaoka

(10) Patent No.: US 11,686,744 B2
(45) Date of Patent: *Jun. 27, 2023

(54) POSTURE ESTIMATION METHOD, POSTURE ESTIMATION DEVICE, AND VEHICLE

(71) Applicant: SEIKO EPSON CORPORATION, Tokyo (JP)

(72) Inventor: Yasushi Nakaoka, Shiojiri (JP)

(73) Assignee: SEIKO EPSON CORPORATION, Tokyo (JP)

(*) Notice: Subject to any disclaimer, the term of this patent is extended or adjusted under 35 U.S.C. 154(b) by 0 days.

This patent is subject to a terminal disclaimer.

(21) Appl. No.: 17/749,781

(22) Filed: May 20, 2022

(65) Prior Publication Data

US 2022/0291254 A1    Sep. 15, 2022

Related U.S. Application Data

(63) Continuation of application No. 16/526,316, filed on Jul. 30, 2019, now Pat. No. 11,372,020.

(30) Foreign Application Priority Data

Jul. 31, 2018    (JP) .................... 2018-143690

(51) Int. Cl.
| | |
|---|---|
| *G01P 21/00* | (2006.01) |
| *G01P 3/00* | (2006.01) |
| *B60W 40/112* | (2012.01) |
| *B60W 40/11* | (2012.01) |

(52) U.S. Cl.
CPC ............ *G01P 21/00* (2013.01); *G01P 3/00* (2013.01); *B60W 40/11* (2013.01); *B60W 40/112* (2013.01)

(58) Field of Classification Search
CPC ..... B60W 40/11; B60W 40/112; G01P 21/00; G01P 3/00
See application file for complete search history.

(56) References Cited

U.S. PATENT DOCUMENTS

| | | | |
|---|---|---|---|
| 9,339,226 B2 | 5/2016 | van der Walt et al. | |
| 9,599,635 B2* | 3/2017 | Nomura | G01C 25/005 |
| 11,372,020 B2* | 6/2022 | Nakaoka | G01C 25/00 |
| 2010/0161272 A1* | 6/2010 | Yamashita | G01P 15/18 |
| | | | 702/150 |
| 2021/0033242 A1 | 2/2021 | Zhang et al. | |

FOREIGN PATENT DOCUMENTS

JP    2015-179002    10/2015

* cited by examiner

*Primary Examiner* — Elias Desta
(74) *Attorney, Agent, or Firm* — Rankin, Hill & Clark LLP

(57) ABSTRACT

A posture estimation method includes calculating a posture change amount of an object based on an output of an angular velocity sensor, predicting posture information of the object by using the posture change amount, limiting a bias error in a manner of limiting a bias error component of an angular velocity around a reference vector in error information, and correcting the predicted posture information of the object based on the error information, the reference vector, and an output of a reference observation sensor.

5 Claims, 13 Drawing Sheets

POSTURE ESTIMATION METHOD, POSTURE ESTIMATION DEVICE, AND VEHICLE

The present application is based on, and claims priority from JP Application Serial Number 2018-143690, filed Jul. 31, 2018, the disclosure of which is hereby incorporated by reference herein in its entirety.

BACKGROUND

1. Technical Field

The present disclosure relates to a posture estimation method, a posture estimation device, and a vehicle.

2. Related Art

A device or a system of mounting an inertial measurement unit (IMU) on an object and calculating the position or posture of the object with an output signal of the inertial measurement unit (IMU) is known. A bias error is provided in the output signal of the inertial measurement unit (IMU), and an error also occurs in posture calculation. Thus, a technique of correcting such an error with a Kalman filter and estimating the accurate posture of the object is proposed. For example, JP-A-2015-179002 discloses a posture estimation method of calculating a posture change amount of an object by using an output of an angular velocity sensor and estimating the posture of the object by using the posture change amount.

JP-A-2015-179002 is an example of the related art.

However, in the posture estimation method disclosed in JP-A-2015-179002, when the posture of an object changes small, a bias error in the output of the angular velocity sensor monotonously increases, and thus estimation accuracy of the posture of the object may decrease.

SUMMARY

An aspect of a posture estimation method according to the present disclosure includes calculating a posture change amount of an object based on an output of an angular velocity sensor, predicting posture information of the object by using the posture change amount, limiting a bias error in a manner of limiting a bias error component of an angular velocity around a reference vector in error information, and correcting the predicted posture information of the object based on the error information, the reference vector, and an output of a reference observation sensor.

In the aspect of the posture estimation method, the limiting of the bias error may include determining whether or not the bias error component exceeds an upper limit, and limiting the bias error component when the bias error component exceeds the upper limit.

The aspect of the posture estimation method may further include removing a rotational error component around the reference vector in the error information.

In the aspect of the posture estimation method, the reference observation sensor may be an acceleration sensor.

In the aspect of the posture estimation method, a rotation error around the reference vector may be an azimuth error.

In the aspect of the posture estimation method, the reference vector may be a gravitational acceleration vector.

In the aspect of the posture estimation method, in the correcting of the posture information, the posture information may be corrected based on a difference between an acceleration vector obtained based on an output of an acceleration sensor and the gravitational acceleration vector.

An aspect of a posture estimation device according to the present disclosure includes a posture-change-amount calculation unit that calculates a posture change amount of an object based on an output of an angular velocity sensor, a posture information prediction unit that predicts posture information of the object by using the posture change amount, an error information update unit that updates error information based on the output of the angular velocity sensor, a bias error limitation unit that limits a bias error component of an angular velocity around a reference vector, in the error information, and a posture information correction unit that corrects the predicted posture information of the object based on the error information, the reference vector, and an output of a reference observation sensor.

An aspect of a vehicle according to the present disclosure includes the aspect of the posture estimation device and a control device that controls a posture of the vehicle based on posture information of the vehicle, which is estimated by the posture estimation device.

DESCRIPTION OF EXEMPLARY EMBODIMENTS

Figure 1:
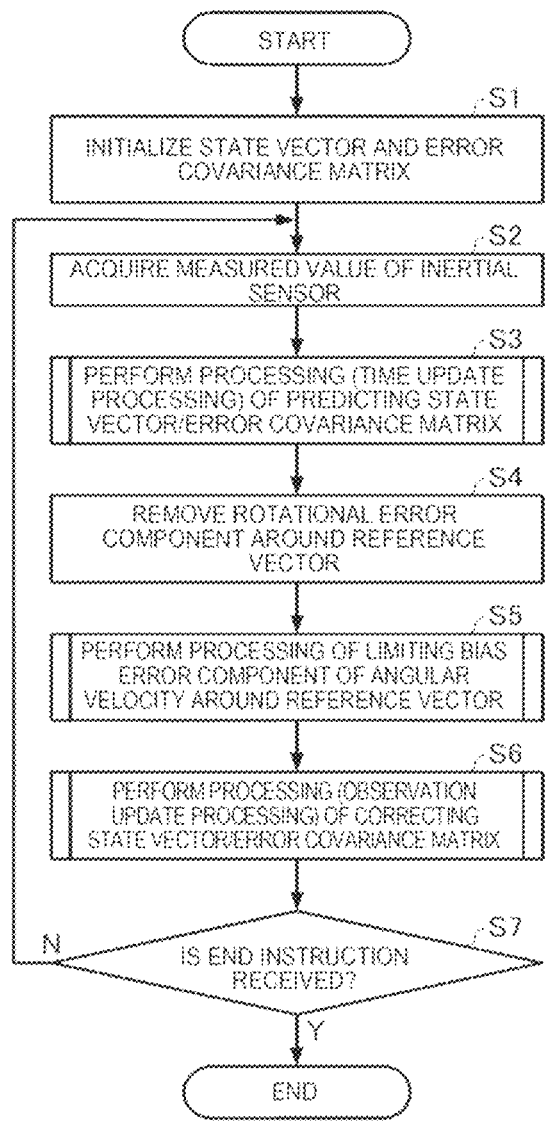
FIG. 1 is a flowchart illustrating an example of procedures of a posture estimation method.

Hereinafter, a preferred embodiment according to the present disclosure will be described in detail with reference to the drawings. Embodiments described below do not unduly limit the contents of the present disclosure described in the appended claims. All components described below are not essential components in the present disclosure.

1. Posture Estimation Method

1-1. Posture Estimation Theory
1-1-1. IMU Output Model

The output of the inertial measurement unit (IMU) includes angular velocity data $d_{\omega,k}$ as an output of a three-axis angular velocity sensor and acceleration data $d_{\alpha,k}$ as an output of a three-axis acceleration sensor at each sampling time point ($t_k$). Here, as shown in Expression (1), the angular velocity data $d_{\omega,k}$ is represented by the sum of an average value of an angular velocity vector ω in a sampling interval ($\Delta t = t_k - t_{k-1}$) and the residual bias $b_\omega$.

$$d_{\omega,k} = \begin{bmatrix} d_{\omega x,k} \\ d_{\omega y,k} \\ d_{\omega z,k} \end{bmatrix} = \overline{\omega}_z + b_\omega, \quad (1)$$

$$\overline{\omega}_k = \frac{1}{\Delta t} \int_{t_{k-1}}^{t_k} \omega \, dt$$

Similarly, as shown in Expression (2), the acceleration data $d_{\alpha,k}$ is also represented by the sum of an average value of an acceleration vector α and the residual bias $b_\alpha$.

$$d_{\alpha,k} = \begin{bmatrix} d_{\alpha x,k} \\ d_{\alpha y,k} \\ d_{\alpha z,k} \end{bmatrix} = \overline{\alpha}_k + b_\alpha, \quad (2)$$

$$\overline{\alpha}_k = \frac{1}{\Delta t} \int_{t_{k-1}}^{t_k} \alpha \, dt$$

1-1-2. Calculation of Three-dimensional Posture by Angular Velocity Integration When a three-dimensional posture is represented by quaternions, a relation between the posture quaternion q and the angular velocity vector ω [rad/s] is represented by a differential equation in Expression (3).

$$\frac{d}{dt} q = \frac{1}{2} q \otimes \omega \quad (3)$$

Here, a symbol obtained by superimposing O and × on each other indicates quaternion multiplication. For example, elements of quaternion multiplication of q and p are calculated as shown in Expression (4).

$$q \otimes p = \begin{bmatrix} +q_0 & -q_1 & -q_2 & -q_3 \\ +q_1 & +q_0 & -q_3 & +q_2 \\ +q_2 & +q_3 & +q_0 & -q_1 \\ +q_3 & -q_2 & +q_1 & +q_0 \end{bmatrix} \begin{bmatrix} p_0 \\ p_1 \\ p_2 \\ p_3 \end{bmatrix} = \begin{bmatrix} q_0 p_0 - q_1 p_1 - q_2 p_2 - q_3 p_3 \\ q_1 p_0 + q_0 p_1 - q_3 p_2 + q_2 p_3 \\ q_2 p_0 + q_3 p_1 + q_0 p_2 - q_1 p_3 \\ q_3 p_0 - q_2 p_1 + q_1 p_2 + q_0 p_3 \end{bmatrix} \quad (4)$$

As shown in Expression (5), the angular velocity vector w is considered as being equivalent to a quaternion in which the real (scalar) component is zero, and the imaginary (vector) component coincides with the component of ω.

$$\omega = \begin{bmatrix} \omega_x \\ \omega_y \\ \omega_z \end{bmatrix} \begin{bmatrix} 0 \\ \omega_x \\ \omega_y \\ \omega_z \end{bmatrix} = \begin{bmatrix} 0 \\ \omega \end{bmatrix} \quad (5)$$

If the differential equation (3) is solved, it is possible to calculate the three-dimensional posture. However, unfortunately, the general solution thereof has not been found. Further, the value of the angular velocity vector ω is also obtained in only a form of a discrete average value. Thus, it is necessary that approximation calculation is performed with Expression (6) for each short (sampling) time.

$$q_k \approx q_{k-1} \otimes \Delta q_k \begin{cases} \Delta q_k = 1 + \frac{\overline{\omega}_2}{2} \Delta t + \left( \frac{\overline{\omega}_{k+1} \times \overline{\omega}_k}{24} - \frac{|\overline{\omega}_k|^2}{8} \right) \Delta t^2 - \\ \qquad \frac{|\overline{\omega}_k|^2 \overline{\omega}_k}{48} \Delta t^3 \\ = \begin{bmatrix} 1 - \frac{1}{8} |\overline{\omega}_k \Delta t|^2 \\ \frac{1}{2} \overline{\omega}_k \Delta t + \frac{1}{24} (\overline{\omega}_{k-1} \Delta t \times \overline{\omega}_k \Delta t) - \\ \frac{1}{48} |\overline{\omega}_k \Delta t|^2 \overline{\omega}_k \Delta t \end{bmatrix} \end{cases} \quad (6)$$

Expression (6) is an expression calculated based on Taylor expansion at each of $t = t_{k-1}$ to the third-order term of $\Delta t$, considering the posture quaternion q and an integration relation of the angular velocity vector co for each axis. The term including $\omega_{k-1}$ in the expression corresponds to the Corning correction term. The symbol × indicates a cross product (vector product) of a three-dimensional vector. For example, the elements of v×w are calculated as in Expression (7).

$$v \times w = \begin{bmatrix} 0 & -v_z & +v_y \\ +v_z & 0 & -v_x \\ -v_y & +v_x & 0 \end{bmatrix} \begin{bmatrix} \omega_x \\ \omega_y \\ \omega_z \end{bmatrix} = \begin{bmatrix} v_y \omega_z - v_z \omega_y \\ v_z \omega_x - v_x \omega_z \\ v_x \omega_y - v_y \omega_x \end{bmatrix} \quad (7)$$

1-1-3. Tilt Error Observation by Gravitational Acceleration

The acceleration sensor detects an acceleration generated by the movement thereof. However, on the earth, the acceleration is normally detected in a state of adding a gravitational acceleration of about 1 [G] (=9.80665 [m/s²]). The gravitational acceleration is normally a vector in a vertical direction. Thus, it is possible to know an error of a tilt (roll and pitch) component of the posture by comparison to the output of the three-axis acceleration sensor. Therefore, firstly, it is necessary that an acceleration vector α in the sensor coordinate system (xyz coordinate system), which is observed by the three-axis acceleration sensor is transformed into an acceleration vector α' in a coordinate system (XYZ coordinate system) of a local space obtained by horizontal orthogonal axes and a vertical axis. The coordinate (rotation) transformation can be calculated with the posture quaternion q and conjugate quaternion q*, as shown in Expression (8).

$$\alpha' = q \otimes \alpha \otimes q^* \quad (8)$$

Expression (8) can be expressed with a three-dimensional coordinate transformation matrix C, as in Expression (9).

$$\alpha' = C\alpha \quad (9)$$

$$\begin{cases} C = \begin{bmatrix} q_0^2 + q_1^2 - q_2^2 - q_3^2 & 2(q_1 q_2 - q_0 q_3) & 2(q_1 q_3 + q_0 q_2) \\ 2(q_1 q_2 + q_0 q_3) & q_0^2 - q_1^2 + q_2^2 - q_3^2 & 2(q_2 q_3 - q_0 q_1) \\ 2(q_1 q_3 - q_0 q_2) & 2(q_2 q_3 + q_0 q_1) & q_0^2 - q_1^2 - q_2^2 + q_3^2 \end{bmatrix} \end{cases}$$

A tilt error is obtained by comparing the acceleration vector α' to the gravitational acceleration vector g in the local-space coordinate system (XYZ coordinate system). The gravitational acceleration vector g is represented by Expression (10). In Expression (10), Δg indicates a gravitational-acceleration correction value indicating a difference [G] from the standard value of the gravitational acceleration vector g.

$$g = \begin{bmatrix} 0 \\ 0 \\ -(1+\Delta g) \end{bmatrix} \quad (10)$$

1-1-4. Observation of Zero Motion Velocity

In particular, the motion velocity of the IMU is considered to be substantially equal to zero in a long term, in user interface applications. A relation between the motion velocity vector v in the local-space coordinate system, and the acceleration vector α and the angular velocity vector ω in the sensor coordinate system is expressed with the coordinate transformation matrix C by a differential equation in Expression (11).

$$\frac{d}{dt}v = C\alpha - g \quad (11)$$

$$\frac{d}{dt}C = C\begin{bmatrix} 0 & -\omega_z & +\omega_y \\ +\omega_z & 0 & -\omega_x \\ -\omega_y & +\omega_x & 0 \end{bmatrix}$$

Here, the values of the acceleration vector α and the angular velocity vector ω are obtained only in a form of a discrete average value. Thus, the motion velocity vector is calculated by performing approximation calculation with Expression (12) for each short (sampling) time.

$$v_k \approx v_{k-1} + (C_k \lambda_k - g)\Delta t \quad (12)$$

$$\begin{cases} \lambda_k = \overline{\alpha}_k + \left(\frac{\overline{\omega}_k \times \overline{\alpha}_k}{2} + \frac{\overline{\omega}_{k-1} \times \overline{\alpha}_k - \overline{\omega}_k \times \overline{\alpha}_{k-1}}{12}\right)\Delta t + \\ \quad \frac{(\overline{\omega}_k \cdot \overline{\alpha}_k)\overline{\omega}_k - |\overline{\omega}_k|^2 \overline{\alpha}_k}{6}\Delta t^2 + \\ \quad (\overline{\omega}_{k-1} \cdot \overline{\alpha}_k - \overline{\omega}_k \cdot \overline{\alpha}_{k-1})\overline{\omega}_k - \\ \quad \frac{(\overline{\omega}_{k-1} \cdot \overline{\omega}_k)\overline{\alpha}_k + |\overline{\omega}_k|^2 \overline{\alpha}_{k-1}}{24}\Delta t^2 - \frac{|\omega_k|^2}{24}\overline{\omega}_k \times \overline{\alpha}_k \Delta t^3 \\ = \overline{\alpha}_k + \frac{1}{2}(\overline{\omega}_k \Delta t \times \overline{\alpha}_k) + \frac{1}{12}(\overline{\omega}_{k-1}\Delta t \times \overline{\alpha}_k) - \\ \quad \frac{1}{12}(\overline{\omega}_k \Delta t \times \overline{\alpha}_{k-1}) + \frac{1}{6}(\overline{\omega}_k \Delta t \times (\overline{\omega}_k \Delta t \times \overline{\alpha}_k)) + \\ \quad \frac{1}{21}(\overline{\omega}_{k-1}\Delta t \times (\overline{\omega}_k \Delta t \times \overline{\alpha}_k)) - \\ \quad \frac{1}{24}(\overline{\omega}_k \Delta t \times (\overline{\omega}_k \Delta t \times \overline{\alpha}_{k-1})) - \\ \quad \frac{1}{24}|\overline{\omega}_k \Delta t|^2(\overline{\omega}_k \Delta t \times \overline{\alpha}_k) \end{cases}$$

Expression (12) is an expression calculated based on Taylor expansion at each of $t=t_{k-1}$ to the third-order term of Δt, considering the motion velocity vector v and integration relations of the acceleration vector α and the angular velocity vector ω for each axis. The third-order term is ignored in Expression (12) because of being sufficiently small although the residual error $\varepsilon_\lambda$ is provided in the third-order term. The symbol · indicates a dot product (scalar product) of a three-dimensional vector. For example, v·w is calculated as in Expression (13).

$$v \cdot w = v_x w_x + c_y w_y + v_z w_z \quad (13)$$

1-1-5. Posture Quaternion and Error Thereof

It is considered that the true value (A) of the calculated posture quaternion q has an error $\varepsilon_q$, as in Expression (14).

$$q = \hat{q} + \epsilon_q = \begin{bmatrix} \hat{q}_0 + \epsilon_{q0} \\ \hat{q}_1 + \epsilon_{q1} \\ \hat{q}_2 + \epsilon_{q2} \\ \hat{q}_3 + \epsilon_{q3} \end{bmatrix} \quad (14)$$

$$\Sigma_q^2 = E[\epsilon_q \epsilon_q^T]$$

Here, $\Sigma_q^2$ represents an error covariance matrix indicating the magnitude of the error $\varepsilon_q$. E[·] indicates an expected value. T on the right shoulder indicates transposition of the vector·matrix.

The quaternion and the error have four values, but there are just three degrees of freedom in a three-dimensional posture (rotational transformation). The fourth degree of freedom of the posture quaternion corresponds to enlargement/reduction conversion. However, it is necessary that the enlargement/reduction ratio is normally fixed to 1 in posture detection processing. In practice, a enlargement/reduction ratio component changes by various calculation errors. Thus, processing of suppressing the change of the enlargement/reduction ratio is required.

In a case of the posture quaternion q, the square of the absolute value thereof corresponds to the enlargement/reduction ratio. Thus, the change is suppressed by normalization processing in which the absolute value is set to 1, as in Expression (15).

$$q \leftarrow \frac{q}{|q|} = \frac{1}{\sqrt{q_0^2 + q_1^2 + q_2^2 + q_3^2}} \begin{bmatrix} q_0 \\ q_1 \\ q_2 \\ q_3 \end{bmatrix} \quad (15)$$

In a case of the posture error $\varepsilon_q$, it is necessary to hold the rank (order number) of the error covariance matrix $\Sigma_q^2$ to be three. Thus (assuming that a posture error angle is sufficiently small), the rank is limited as in Expression (16), considering a (three-dimensional) error rotation vector $\varepsilon_\theta$ in the local-space coordinate system.

$$\epsilon_\theta = \begin{bmatrix} \epsilon_{\theta x} \\ \epsilon_{\theta y} \\ \epsilon_{\theta z} \end{bmatrix} \approx 2D\epsilon_q \quad (16)$$

$$\epsilon_q \leftarrow D^T D \epsilon_q$$

$$\Sigma_q^2 \leftarrow D^T D \Sigma_q^2 D^T D$$

$$\begin{cases} D = \begin{bmatrix} -q_1 & +q_0 & -q_3 & +q_2 \\ -q_2 & +q_3 & +q_0 & -q_1 \\ -q_3 & -q_2 & +q_1 & +q_0 \end{bmatrix} \\ D^T D = \begin{bmatrix} q_1^2 + q_2^2 + q_3^2 & -q_0 q_1 & -q_0 q_2 & -q_0 q_3 \\ -q_0 q_1 & q_0^2 + q_2^2 + q_3^2 & -q_1 q_2 & -q_1 q_3 \\ -q_0 q_2 & -q_1 q_2 & q_0^2 + q_1^2 + q_3^2 & -q_2 q_3 \\ -q_0 q_3 & -q_1 q_3 & -q_2 q_3 & q_0^2 + q_1^2 + q_2^2 \end{bmatrix} \end{cases}$$

1-1-6. Removal (Ignoring) of Azimuth Error

When an azimuth observation section such as a magnetic sensor is not provided in posture detection, an azimuthal component of the posture error just monotonously increases and does not serve for any purpose. Further, the increased error estimate causes a feedback gain to unnecessarily increase, and this causes the azimuth to unexpectedly change or vary. Thus, an azimuth error component $\varepsilon_{\theta z}$ is removed from Expression (16).

$$\varepsilon'_\theta = \begin{bmatrix} \varepsilon_{\theta x} \\ \varepsilon_{\theta y} \end{bmatrix} \approx 2D'\varepsilon_q \quad (17)$$

$$\varepsilon_q \leftarrow D'^T D' \varepsilon_q$$

$$\Sigma_q^2 \leftarrow D'^T D' \Sigma_q^2 D'^T D'$$

$$\begin{cases} D' = \begin{bmatrix} -q_1 & +q_0 & -q_3 & +q_2 \\ -q_2 & +q_3 & +q_0 & -q_1 \end{bmatrix} \\ D'^T D' = \begin{bmatrix} q_1^2 + q_2^2 & -q_0 q_1 - q_2 q_3 & q_1 q_3 - q_0 q_2 & 0 \\ -q_0 q_1 - q_2 q_3 & q_0^2 + q_3^2 & 0 & q_0 q_2 - q_1 q_3 \\ q_1 q_3 - q_0 q_2 & 0 & q_0^2 + q_3^2 & -q_0 q_1 - q_2 q_3 \\ 0 & q_0 q_2 - q_1 q_3 & -q_0 q_1 - q_2 q_3 & q_1^2 + q_2^2 \end{bmatrix} \end{cases}$$

1-1-7. Extended Kalman Filter

An extended Kalman filter that calculates a three-dimensional posture based on the above model expressions can be designed.

State Vector and Error Covariance Matrix

As in Expression (18), the posture quaternion q, the motion velocity vector v, the residual bias $b_\omega$ (offset to angular velocity vector $\omega$) of the angular velocity sensor, the residual bias $b_\alpha$ (offset to acceleration vector $\alpha$) of the acceleration sensor, and the gravitational-acceleration correction value $\Delta g$, as unknown state values to be obtained, constitute a state vector x (14-dimensional vector) of the extended Kalman filter. In addition, the error covariance matrix $\Sigma_x^2$ is defined.

$$x = \begin{bmatrix} q \\ v \\ b_\omega \\ b_a \\ \Delta g \end{bmatrix}, \quad \epsilon_x = \begin{bmatrix} \varepsilon_q \\ \varepsilon_v \\ \varepsilon_{b\omega} \\ \varepsilon_{ba} \\ \varepsilon_{\Delta g} \end{bmatrix} \quad (18)$$

$$\Sigma_x^2 = E[\varepsilon_x \varepsilon_x^T], \quad x = \hat{x} + \varepsilon_x$$

Process Model

In a process model, the value of the latest state vector is predicted based on the sampling interval $\Delta t$ and values of the angular velocity data $d_\omega$ and the acceleration data $d_\alpha$, as in Expression (19).

$$x_k = \begin{bmatrix} q_k \\ v_k \\ b_{\omega,k} \\ b_{a,k} \\ \Delta g_k \end{bmatrix} = \begin{bmatrix} q_{k-1} \otimes \Delta q_k \\ v_{k-1} + (C_k \lambda_k - g_{k-1})\Delta t \\ b_{\omega,k-1} \\ b_{a,k-1} \\ \Delta g_{k-1} \end{bmatrix} \quad (19)$$

$$\begin{cases} \Delta q_k = 1 + \dfrac{\overline{\omega}_k}{2}\Delta t + \left(\dfrac{\overline{\omega}_{k-1} \times \overline{\omega}_k}{24} - \dfrac{|\overline{\omega}_k|^2}{8}\right)\Delta t^2 - \dfrac{|\overline{\omega}_k|^2 \overline{\omega}_k}{48}\Delta t^3 \\[4pt]
C_{k+1} = \begin{bmatrix} q_{0,k}^2 + q_{1,k}^2 - q_{2,k}^2 - q_{3,k}^2 & 2(q_{1,k}q_{2,k} - q_{0,k}q_{3,k}) & 2(q_{1,k}q_{3,k} + q_{0,k}q_{2,k}) \\ 2(q_{1,k}q_{2,k} + q_{0,k}q_{3,k}) & q_{0,k}^2 - q_{1,k}^2 + q_{2,k}^2 - q_{3,k}^2 & 2(q_{2,k}q_{3,k} - q_{0,k}q_{1,k}) \\ 2(q_{1,k}q_{3,k} - q_{0,k}q_{2,k}) & 2(q_{2,k}q_{3,k} + q_{0,k}q_{1,k}) & q_{0,k}^2 - q_{1,k}^2 - q_{2,k}^2 + q_{3,k}^2 \end{bmatrix} \\[4pt]
\lambda_k = \overline{\alpha}_k + \left(\dfrac{\overline{\omega}_k \times \overline{\alpha}_k}{2} + \dfrac{\overline{\omega}_{k-1} \times \overline{\alpha}_k - \overline{\omega}_k \times \overline{\alpha}_{k-1}}{12}\right)\Delta t + \dfrac{(\overline{\omega}_k \cdot \overline{\alpha}_k)\overline{\omega}_k - |\overline{\omega}_k|^2 \overline{\alpha}_k}{6}\Delta t^2 + \\
\quad (\overline{\omega}_{k-1} \cdot \overline{\alpha}_k - \overline{\omega}_k \cdot \overline{\alpha}_{k-1})\overline{\omega}_k - \\
\quad \dfrac{(\overline{\omega}_{k-1} \cdot \overline{\omega}_k)\overline{\alpha}_k + |\overline{\omega}_k|^2 \overline{\alpha}_{k-1}}{24}\Delta t^2 - \dfrac{|\overline{\omega}_k|^2}{24}\overline{\omega}_k \times \overline{\alpha}_k \Delta t^3 \\[4pt]
g_k = [0 \quad 0 \quad -(1+\Delta g_k)]^T \\
\overline{\omega}_k = d_{\omega,k} - b_{\omega,k-1} \\
\overline{\alpha}_k = d_{\alpha,k} - b_{a,k-1}
\end{cases}$$

The covariance matrix of a state error is updated as in Expression (20) by receiving influences of noise components $\eta_\omega$ and $\eta_\alpha$ of the angular velocity data $d_\omega$ and the acceleration data $d_\alpha$, and process noise $\rho_\omega$, $\rho_\alpha$, and $\rho_g$ indicating instability of the residual bias $b_\omega$ of the angular velocity sensor, the residual bias $b_\alpha$ of the acceleration sensor, and the value (gravitational acceleration value) of the gravitational acceleration vector g.

$$\Sigma_{x,k}^2 = A_k \Sigma_{x,k-1}^2 A_k^T + W_k \Sigma_{\rho,k}^2 W_k^T \quad (20)$$

$$\begin{cases} A_k \approx \begin{bmatrix} J_{q/q,k} & 0_{4\times 3} & -J_{q/\omega,k} & 0_{4\times 3} & 0_4 \\ \begin{bmatrix} J_{v/q,k} \\ 0_4^T \end{bmatrix} & I_3 & 0_{3\times 3} & -C_k \Delta t & \begin{bmatrix} 0_2 \\ \Delta t \end{bmatrix} \\ 0_{3\times 4} & 0_{3\times 3} & I_3 & 0_{3\times 3} & 0_3 \\ 0_{3\times 4} & 0_{3\times 3} & 0_{3\times 3} & I_3 & 0_3 \\ 0_4^T & 0_3^T & 0_3^T & 0_3^T & 1 \end{bmatrix} \\[4pt]
W_k \approx \begin{bmatrix} J_{q/\omega,k} & 0_{4\times 3} & 0_{4\times 3} & 0_{4\times 3} & 0_4 \\ 0_{3\times 3} & C_k \Delta t & 0_{3\times 3} & 0_{3\times 3} & 0_3 \\ 0_{3\times 3} & 0_{3\times 3} & \sqrt{\Delta t} I_3 & 0_{3\times 3} & 0 \\ 0_{3\times 3} & 0_{3\times 3} & 0_{3\times 3} & \sqrt{\Delta t} I_3 & 0_3 \\ 0_3^T & 0_3^T & 0_{1\times 3} & 0_3^T & \sqrt{\Delta t} \end{bmatrix} \\[4pt]
\Sigma_{\rho,k}^2 = \begin{bmatrix} \Sigma_{\eta\omega,k}^2 & 0_{3\times 3} & 0_{3\times 3} & 0_{3\times 3} & 0_3 \\ 0_{3\times 3} & \Sigma_{\eta\alpha,k}^2 & 0_{3\times 3} & 0_{3\times 3} & 0_3 \\ 0_{3\times 3} & 0_{3\times 3} & \Sigma_{\rho\omega}^2 & 0_{3\times 3} & 0_3 \\ 0_{3\times 3} & 0_{3\times 3} & 0_{3\times 3} & \Sigma_{\rho\alpha}^2 & 0_3 \\ 0_3^T & 0_3^T & 0_3^T & 0_3^T & \sigma_{\rho g}^2 \end{bmatrix}
\end{cases}$$

Here, $O_{n\times m}$ indicates a zero matrix having n rows and m columns. $I_{n\times m}$ indicates an identity matrix having rows and m columns. J . . . indicates a matrix of propagation coefficients of each error obtained by partial differentiation of the process model, as with Expression (21). Σ . . . indicates a covariance matrix of each type of noise as with Expression (22).

$$J_{q/q,k} = \begin{bmatrix} +\Delta q_{0,k} & -\Delta q_{1,k} & -\Delta q_{2,k} & -\Delta q_{3,k} \\ +\Delta q_{1,k} & +\Delta q_{0,k} & +\Delta q_{3,k} & -\Delta q_{2,k} \\ +\Delta q_{2,k} & -\Delta q_{3,k} & +\Delta q_{0,k} & +\Delta q_{1,k} \\ +\Delta q_{3,k} & +\Delta q_{2,k} & -\Delta q_{1,k} & +\Delta q_{0,k} \end{bmatrix}$$ (21)

$$J_{q/\omega,k} = \frac{1}{2}\begin{bmatrix} -q_{1,k-1} & -q_{2,k-1} & -q_{3,k-1} \\ +q_{0,k-1} & -q_{3,k-1} & +q_{2,k-1} \\ +q_{3,k-1} & +q_{0,k-1} & -q_{1,k-1} \\ -q_{2,k-1} & +q_{1,k-1} & +q_{0,k-1} \end{bmatrix}\Delta t$$

$$J_{v/q,k} = 2\begin{bmatrix} +r_{1,k} & +r_{0,k} & +r_{3,k} & -r_{2,k} \\ +r_{2,k} & -r_{3,k} & +r_{0,k} & +r_{1,k} \end{bmatrix}\Delta t,$$

$$\begin{bmatrix} r_{0,k} \\ r_{1,k} \\ r_{2,k} \\ r_{3,k} \end{bmatrix} = \begin{bmatrix} +q_{1,k-1} & +q_{2,k-1} & +q_{3,k-1} \\ +q_{0,k-1} & -q_{3,k-1} & +q_{2,k-1} \\ +q_{3,k-1} & +q_{0,k-1} & -q_{1,k-1} \\ -q_{2,k-1} & +q_{1,k-1} & +q_{0,k-1} \end{bmatrix}\lambda_k$$ (22)

$$\Sigma^2_{\eta\omega,k} = E[\eta_\omega \eta_\omega^T] = \begin{bmatrix} \sigma^2_{\eta\omega x,k} & 0 & 0 \\ 0 & \sigma^2_{\eta\omega y,k} & 0 \\ 0 & 0 & \sigma^2_{\eta\omega z,k} \end{bmatrix}$$

$$\Sigma^2_{\eta\alpha,k} = E[\eta_\alpha \eta_\alpha^T] = \begin{bmatrix} \sigma^2_{\eta\alpha x,k} & 0 & 0 \\ 0 & \sigma^2_{\eta\alpha y,k} & 0 \\ 0 & 0 & \sigma^2_{\eta\alpha z,k} \end{bmatrix}$$

$$\Sigma^2_{\rho\omega} = E[\rho_\omega \rho_\omega^T] = \begin{bmatrix} \sigma^2_{\rho\omega x,k} & 0 & 0 \\ 0 & \sigma^2_{\rho\omega y,k} & 0 \\ 0 & 0 & \sigma^2_{\rho\omega z,k} \end{bmatrix}$$

$$\Sigma^2_{\rho\alpha} = E[\rho_\alpha \rho_\alpha^T] = \begin{bmatrix} \sigma^2_{\rho\alpha x,k} & 0 & 0 \\ 0 & \sigma^2_{\rho\alpha y,k} & 0 \\ 0 & 0 & \sigma^2_{\rho\alpha z,k} \end{bmatrix}$$

Observation Model

In an observation model, an observation residual Δz in which an observation residual $\Delta z_a$ of the gravitational acceleration based on acceleration data $d_\alpha$ and an observation residual $\Delta z_v$ of the zero motion velocity are used as elements is calculated as in Expression (23).

$$\Delta z_k = \begin{bmatrix} \Delta z_{a,k} \\ \Delta z_{v,k} \end{bmatrix} = \begin{bmatrix} C_k \bar{\alpha}_k - g_k \\ v_k \end{bmatrix}$$ (23)

Here, a Kalman coefficient K is calculated, as in Expression (24), by adding the noise component $\rho_\alpha$ of the acceleration data $d_\alpha$ and the motion acceleration component $\zeta_\alpha$ and the motion velocity component cv as observation errors.

$$K_k = \Sigma^2_{x,k} H_k^T (H_k \Sigma^2_{x,k} H_k^T + V_k \Sigma^2_{\zeta,k} V_k^T)^{-1}$$ (24)

$$H_k = \begin{bmatrix} \begin{bmatrix} J_{za/q,k} \\ 0_4^T \end{bmatrix} & 0_{3\times 3} & 0_{3\times 3} & 0_{3\times 3} & \begin{bmatrix} 0_2 \\ 1 \end{bmatrix} \\ 0_{3\times 4} & I_3 & 0_{3\times 3} & 0_{3\times 3} & 0_3 \end{bmatrix}$$

$$\Sigma^2_{\zeta,k} = \begin{bmatrix} \Sigma^2_{\eta\alpha,k} & 0_{3\times 3} & 0_{3\times 3} \\ 0_{3\times 3} & \Sigma^2_{\zeta a,k} & 0_{3\times 3} \\ 0_{3\times 3} & 0_{3\times 3} & \Sigma^2_{\zeta v,k} \end{bmatrix}$$

$$V_k = \begin{bmatrix} C_k & -I_3 & 0_{3\times 3} \\ 0_{3\times 3} & 0_{3\times 3} & -I_3 \end{bmatrix}$$

Here, J . . . is the matrix of propagation coefficients of each error obtained by partial differentiation of the observation model, as with Expression (25). Σ . . . indicates a covariance matrix of each type of noise as with Expression (26).

$$J_{za/q,k} = 2\begin{bmatrix} +s_{1,k} & +s_{0,k} & +s_{3,k} & -s_{2,k} \\ +s_{2,k} & -s_{3,k} & +s_{0,k} & +s_{1,k} \\ 0 & 0 & 0 & 0 \end{bmatrix},$$ (25)

$$\begin{bmatrix} s_{0,k} \\ s_{1,k} \\ s_{2,k} \\ s_{3,k} \end{bmatrix} = \begin{bmatrix} +q_{1,k} & +q_{2,k} & +q_{3,k} \\ +q_{0,k} & -q_{3,k} & +q_{2,k} \\ +q_{3,k} & +q_{0,k} & -q_{1,k} \\ -q_{2,k} & +q_{1,k} & +q_{0,k} \end{bmatrix}\bar{\alpha}_k$$

$$J_{za/g,k} = \begin{bmatrix} 0 \\ 0 \\ 1 \end{bmatrix}$$

$$\Sigma^2_{\zeta a,k} = E[\zeta_a \zeta_a^T] = \begin{bmatrix} \sigma^2_{\zeta a x,k} & 0 & 0 \\ 0 & \sigma^2_{\zeta a y,k} & 0 \\ 0 & 0 & \sigma^2_{\zeta a z,k} \end{bmatrix} + \frac{\mu^2}{3}|\Delta z_{a,k}|^2 I_3$$ (26)

$$\Sigma^2_{\zeta v,k} = E[\zeta_v \zeta_v^T] = \begin{bmatrix} \sigma^2_{\zeta v x,k} & 0 & 0 \\ 0 & \sigma^2_{\zeta v y,k} & 0 \\ 0 & 0 & \sigma^2_{\zeta v z,k} \end{bmatrix}$$

Here, μ is a coefficient for calculating the RMS of the error of each axis from the predicted motion acceleration. The state vector x is corrected, as in Expression (27), and the error covariance matrix $\Sigma_x^2$ thereof is updated, by using the Kalman coefficient K.

$$x_k \leftarrow x_k - K_k \Delta z_k$$

$$\Sigma^2_{x,k} \Sigma^2_{x,k} - K_k H_k \Sigma^2_{x,k}$$ (27)

Posture Normalization Model

In the posture normalization model, Expression (28) is updated in order to maintain the posture quaternion and the error covariance thereof to proper values.

$$x_k = \begin{bmatrix} q_k \\ v_k \\ b_{\omega,k} \\ b_{\alpha,k} \\ \Delta g_k \end{bmatrix} \leftarrow \begin{bmatrix} \frac{q_k}{|q_k|} \\ v_k \\ b_{\omega,k} \\ b_{\alpha,k} \\ \Delta g_k \end{bmatrix}$$ (28)

$$\Sigma^2_{x,k} \leftarrow \begin{bmatrix} D_k'^T D_k' & 0_{4\times 10} \\ 0_{10\times 4} & I_{10} \end{bmatrix} \Sigma^2_{x,k} \begin{bmatrix} D_k'^T D_k' & 0_{4\times 10} \\ 0_{10\times 4} & I_{10} \end{bmatrix}$$

Here, D'$^T$D' indicates a matrix of Expression (29) for limiting the rank of the posture error and removing the azimuthal component.

$$D_k'^T D_k' = \begin{bmatrix} q_{1,k}^2 + q_{2,k}^2 & -q_{0,k}q_{1,k} - q_{2,k}q_{3,k} & q_{1,k}q_{3,k} - q_{0,k}q_{2,k} & 0 \\ -q_{0,k}q_{1,k} - q_{2,k}q_{3,k} & q_{0,k}^2 + q_{3,k}^2 & 0 & q_{0,k}q_{2,k} - q_{1,k}q_{3,k} \\ q_{1,k}q_{3,k} - q_{0,k}q_{2,k} & 0 & q_{0,k}^2 + q_{3,k}^2 & -q_{0,k}q_{1,k} - q_{2,k}q_{3,k} \\ 0 & q_{0,k}q_{2,k} - q_{1,k}q_{3,k} & -q_{0,k}q_{1,k} - q_{2,k}q_{3,k} & q_{1,k}^2 + q_{2,k}^2 \end{bmatrix} \quad (29)$$

1-1-8. Initial Value

State Vector and Error Covariance Matrix

Initial values of the state vector x and the error covariance matrix $\Sigma_x^2$ are given as in Expression (30).

$$x_0 = \begin{bmatrix} q_0 \\ v_0 \\ b_{\omega,0} \\ b_{\alpha,0} \\ \Delta g_0 \end{bmatrix} \quad (30)$$

$$\Sigma_{x,0}^2 = \begin{bmatrix} \Sigma_{q,0}^2 & 0_{4\times3} & 0_{4\times3} & 0_{4\times3} & 0_4 \\ 0_{3\times4} & \Sigma_{v,0}^2 & 0_{3\times3} & 0_{3\times3} & 0_3 \\ 0_{3\times4} & 0_{3\times3} & \Sigma_{b\omega,0}^2 & 0_{3\times3} & 0_3 \\ 0_{3\times4} & 0_{3\times3} & 0_{3\times3} & \Sigma_{b\alpha,0}^2 & 0_3 \\ 0_4^T & 0_3^T & 0_3^T & 0_3^T & \sigma_{\Delta g,0}^2 \end{bmatrix}$$

Posture Quaternion

It is necessary that the posture of the IMU is given in quaternion expression. The posture quaternion q can be calculated from a roll (bank) angle φ [rad], a pitch (elevation) angle θ [rad], and a yaw angle (azimuth)ψ [rad] used for the posture and the like of an aircraft, as in Expression (31).

$$q = \begin{bmatrix} q_0 \\ q_1 \\ q_2 \\ q_3 \end{bmatrix} = \begin{bmatrix} \sin\frac{\phi}{2}\sin\frac{\theta}{2}\sin\frac{\psi}{2} + \cos\frac{\phi}{2}\cos\frac{\theta}{2}\cos\frac{\psi}{2} \\ \sin\frac{\phi}{2}\cos\frac{\theta}{2}\cos\frac{\psi}{2} - \cos\frac{\phi}{2}\sin\frac{\theta}{2}\sin\frac{\psi}{2} \\ \cos\frac{\phi}{2}\sin\frac{\theta}{2}\cos\frac{\psi}{2} + \sin\frac{\phi}{2}\cos\frac{\theta}{2}\sin\frac{\psi}{2} \\ \cos\frac{\phi}{2}\cos\frac{\theta}{2}\sin\frac{\psi}{2} - \sin\frac{\phi}{2}\sin\frac{\theta}{2}\cos\frac{\psi}{2} \end{bmatrix} \quad (31)$$

The error covariance matrix $\Sigma_q^2$ is calculated from RMS$\sigma_\varphi$, [rad RMS] of a roll angle error and RMS$\sigma_\theta$ [rad RMS] of a pitch angle error, as in Expression (32) (yaw angle error is ignored).

$$\Sigma_q^2 = \frac{1}{4} D'^T \begin{bmatrix} \sigma_\phi^2 & 0 \\ 0 & \sigma_\theta^2 \end{bmatrix} D' \quad (32)$$

$$D' = \begin{bmatrix} -q_1 & +q_0 & -q_3 & +q_2 \\ -q_2 & +q_3 & +q_0 & -q_1 \end{bmatrix}$$

Motion Velocity Vector

If the initial state is stationary, the motion velocity vector v may be to be required to 0. The error covariance matrix $\Sigma_v^2$ is given based on RMS$\sigma_{vx}$, RMS$\sigma_{vy}$, and RMS$\alpha_{vz}$ [Gs RMS] of the errors of the motion velocity vector v in the axes, regardless of being stationary, as in Expression (33).

$$\Sigma_v^2 = \begin{bmatrix} \sigma_{vx}^2 & 0 & 0 \\ 0 & \sigma_{vy}^2 & 0 \\ 0 & 0 & \sigma_{vz}^2 \end{bmatrix} \quad (33)$$

Residual Biases of Angular Velocity/Acceleration Sensor

If the residual bias$_\omega$ of the angular velocity sensor and the residual bias $b_\alpha$ of the acceleration sensor are known, the residual biases are required to be appropriately set. When the residual biases are unknown, zero as an expected value is given to the residual biases. Error covariance matrixes $\Sigma_{b\omega}^2$ and $\Sigma_{b\alpha}^2$ are given based on the errors RMS$\sigma_{b\omega x}$, RMS$\sigma_{b\omega y}$, and RMS$\sigma_{b\omega z}$ [rad/s RMS] of the residual biases of the angular velocity sensor in the axes and the errors RMS$\sigma_{b\alpha x}$, RMS$\sigma_{b\alpha y}$, and RMS$\sigma_{b\alpha z}$ [G RMS] of the residual biases of the acceleration sensor in the axes, as in Expression (34).

$$\Sigma_{b\omega}^2 = \begin{bmatrix} \sigma_{b\omega x}^2 & 0 & 0 \\ 0 & \sigma_{b\omega y}^2 & 0 \\ 0 & 0 & \sigma_{b\omega z}^2 \end{bmatrix} \quad (34)$$

$$\Sigma_{b\alpha}^2 = \begin{bmatrix} \sigma_{b\alpha x}^2 & 0 & 0 \\ 0 & \sigma_{b\alpha y}^2 & 0 \\ 0 & 0 & \sigma_{b\alpha z}^2 \end{bmatrix}$$

Gravitational-Acceleration Correction Value

If the gravitational acceleration value is known, a difference from the standard value 1 [G] (=9.80665 [m/s$^2$]) is required to be appropriately set. When the gravitational acceleration value is unknown, zero as an expected value is given to the gravitational acceleration value. RMS$\sigma_{\Delta g}$ [G RMS] of the error of the gravitational acceleration value is applied to the error covariance matrix.

1-1-9. Setting Value

Sampling Interval

Since the posture detection processing from the output of the IMS corresponds to a time integration operation in principle, the sampling interval Δt [s] is an important value, and thus is required to be appropriately set.

Output Noise of Angular Velocity/Acceleration Sensor

The noise components η included in outputs of the angular velocity sensor and the acceleration sensor are considered as the white Gaussian noise of the variance $\sigma_\eta^2$ which is average zero independent for each axis. The magnitude of the noise components is designated by the corresponding RMS values ($\sigma_{\eta\omega x}$, $\sigma_{\eta\omega y}$, $\sigma_{\eta\omega z}$) [rad/s RMS] and ($\sigma_{\eta\alpha x}$, $\sigma_{\eta\alpha y}$, $\sigma_{\eta\alpha z}$) [G RMS], as in Expression (35).

$$\eta_\omega = \begin{bmatrix} \eta_{\omega x} \\ \eta_{\omega y} \\ \eta_{\omega z} \end{bmatrix} \approx \begin{bmatrix} N(0, \sigma_{\eta\omega x}^2) \\ N(0, \sigma_{\eta\omega y}^2) \\ N(0, \sigma_{\eta\omega z}^2) \end{bmatrix} = N(0, \Sigma_{\eta\omega}^2), \quad (57)$$

$$\Sigma_{\eta\omega}^2 = \begin{bmatrix} \sigma_{\eta\omega x}^2 & 0 & 0 \\ 0 & \sigma_{\eta\omega y}^2 & 0 \\ 0 & 0 & \sigma_{\eta\omega z}^2 \end{bmatrix}$$

-continued $$\eta_a = \begin{bmatrix} \eta_{ax} \\ \eta_{ay} \\ \eta_{az} \end{bmatrix} \approx \begin{bmatrix} N(0, \sigma_{\eta ax}^2) \\ N(0, \sigma_{\eta ay}^2) \\ N(0, \sigma_{\eta az}^2) \end{bmatrix} = N(0, \Sigma_{\eta a}^2),$$

$$\Sigma_{\eta a}^2 = \begin{bmatrix} \sigma_{\eta ax}^2 & 0 & 0 \\ 0 & \sigma_{\eta ay}^2 & 0 \\ 0 & 0 & \sigma_{\eta az}^2 \end{bmatrix}$$

Biases of Angular Velocity/Acceleration Sensor and Instability of Gravitational Acceleration Value It is considered that the biases of the angular velocity sensor and the acceleration sensor are not constant and change with time. It is considered that the gravitational acceleration value also slightly changes depending on the surrounding environment. Considering the change as an individual random walk, the instability is designated by ($\sigma_{\rho\omega x}$, $\sigma_{\rho\omega y}$, $\sigma_{\rho\omega z}$) [rad/SR/$\sqrt{s}$] ($\sigma_{\rho\alpha x}$, $\sigma_{\rho\alpha y}$, $\sigma_{\rho\alpha z}$) [G/$\sqrt{s}$], and $\sigma_{\rho g}$ [Gh/$\sqrt{s}$], as in Expression (36).

$$b_{\omega,k} = b_{\omega,k-1} + N\left(0, \sum_{\rho\omega}^2 \Delta t\right), \sum_{\rho\omega}^2 = \begin{bmatrix} \sigma_{\rho\omega x}^2 & 0 & 0 \\ 0 & \sigma_{\rho\omega y}^2 & 0 \\ 0 & 0 & \sigma_{\rho\omega z}^2 \end{bmatrix} \quad (36)$$

$$b_{a,k} = b_{a,k-1} + N\left(0, \sum_{\rho a}^2 \Delta t\right), \sum_{\rho a}^2 = \begin{bmatrix} \sigma_{\rho a x}^2 & 0 & 0 \\ 0 & \sigma_{\rho a y}^2 & 0 \\ 0 & 0 & \sigma_{\rho a z}^2 \end{bmatrix}$$

$$\Delta g_k = \Delta g_{k-1} + N(0, \sigma_{\rho g}^2 \Delta t)$$

Motion Acceleration

When the gravitational acceleration is observed in order to correct the posture, the motion acceleration component $\zeta_a$ acts as the observation error. When this observation error is considered as simple white Gaussian noise, a result that the posture sensitively responds to a large motion acceleration due to a rapid motion is obtained. Thus, a noise model as with Expression (37) of changing the level depending on the magnitude of the estimated motion acceleration (difference between the observed acceleration and the estimated gravitational acceleration) is used, and a linear coefficient $\mu$ [N/A] and a constant term ($\sigma_{\zeta ax}$, $\sigma_{\zeta ay}$, $\sigma_{\zeta az}$) [G RMS] are used as setting items.

$$\zeta_{a,k} \approx N\left(0, \sum_{\zeta a,k}^2\right), \quad (37)$$

$$\sum_{\zeta a,k}^2 = \begin{bmatrix} \sigma_{\zeta ax}^2 & 0 & 0 \\ 0 & \sigma_{\zeta ay}^2 & 0 \\ 0 & 0 & \sigma_{\zeta az}^2 \end{bmatrix} + \frac{\mu^2}{3}|\Delta z_{a,k}|^2 I_3$$

Motion Velocity

In observing the zero motion velocity, it is observed that the motion velocity of the IMU is substantially zero in a long term. The motion velocity component $\zeta_v$ appearing in a short term acts as the observation error. This observation error is considered as the white Gaussian noise independent for each axis, and the magnitude of this observation error is designated by the RMS values ($\sigma_{\zeta vx}$, $\sigma_{\zeta vy}$, $\sigma_{\zeta vz}$) [Gs RMS], as in Expression (38).

$$\zeta_v \approx N\left(0, \sum_{\zeta v}^2\right), \sum_{\zeta v}^2 = \begin{bmatrix} \sigma_{\zeta vx}^2 & 0 & 0 \\ 0 & \sigma_{\zeta vy}^2 & 0 \\ 0 & 0 & \sigma_{\zeta vz}^2 \end{bmatrix} \quad (38)$$

1-1-10. Limitation of Yaw-Axis Component of Bias Error in Angular Velocity Sensor When an azimuth observation section such as a magnetic sensor is not provided, only a yaw-axis component (vertical component) of the bias error of the angular velocity sensor also monotonously increases. Normally, a yaw-axis direction changes with the posture and the sensor coordinates. Thus, for example, even though a z-axis of the angular velocity sensor at a certain time point coincides with a yaw axis, and thus error estimate increases, correction is performed by observing the gravitational acceleration when the posture changes, and thus the z-axis becomes an inclination (for example, a horizontal-axis direction) other than the yaw axis. Thus, the error estimate is reduced. However, for example, when the posture changes small, and the substantially same posture continues for a long time, the error estimate of the yaw-axis component increases, and the feedback gain increases. In addition, the increase of the feedback gain causes the bias estimation value of the angular velocity sensor to change without intention, and thus causes the azimuth of the posture to drift. In addition, it is unlikely that the bias estimation error of even the yaw-axis component of the practical angular velocity sensor increases beyond, for example, the initial bias error without limit. Accordingly, an upper limit value is provided only in the yaw-axis component of the bias estimation error of the angular velocity sensor in the state error covariance matrix, and thus, the yaw-axis component is limited not to exceed the upper limit value.

Firstly, as in Expression (39), the variance $\sigma_{b\omega}^2$ of the yaw-axis component is calculated from the error covariance matrix $\Sigma_{b\omega}^2$ of the residual bias in the angular velocity sensor, based on the current posture quaternion.

$$\sigma_{b\omega n}^2 = c_v^T \sum_{b\omega}^2 c_v = [\,0_7^T \;\; c_v^T \;\; 0_4^T\,] \sum_x^2 \begin{bmatrix} 0_7 \\ c_v \\ 0_4 \end{bmatrix} \quad (39)$$

$$\left\{ c_r = \begin{bmatrix} 2(q_1 q_3 - q_0 q_2) \\ 2(q_2 q_3 + q_0 q_1) \\ q_0^2 - q_1^2 - q_2^2 + q_3^2 \end{bmatrix} \right.$$

When the variance $\sigma_{b\omega}^2$ of the yaw-axis component exceeds the upper limit value $\alpha_{b\omega max}^2$, the yaw-axis component is limited as in Expression (40).

$$\sum_z^2 \leftarrow L_x - \sum_z^2 L_x^T \quad (40)$$

-continued $$L_x = \begin{bmatrix} I_{7\times 7} & 0_{7\times 3} & 0_{7\times 4} \\ 0_{3\times 7} & L_{b\omega} & 0_{3\times 4} \\ 0_{4\times 7} & 0_{4\times 3} & 0_{4\times 4} \end{bmatrix}$$

$$L_{b\omega} = C^T \begin{bmatrix} 1 & 0 & 0 \\ 0 & 1 & 0 \\ 0 & 0 & \sqrt{\frac{\sigma_{b\omega max}^2}{\sigma_{b\omega}^2}} \end{bmatrix} C$$

$$C = \begin{bmatrix} q_0^2 + q_1^2 \\ q_2^2 + q_3^2 & 2(q_1 q_2 - q_0 q_3) & 2(q_1 q_3 + q_0 q_2) \\ 2(q_1 q_2 + q_0 q_3) & \begin{array}{c} q_0^2 - q_1^2 \\ q_2^2 - q_3^2 \end{array} & 2(q_2 q_3 - q_0 q_1) \\ 2(q_1 q_3 + q_0 q_2) & 2(q_2 q_3 + q_0 q_1) & \begin{array}{c} q_0^2 - q_1^2 \\ q_2^2 + q_3^2 \end{array} \end{bmatrix}$$

1-2. Flowchart of Posture Estimation Method

FIG. 1 is a flowchart illustrating an example of procedures of a posture estimation method according to the embodiment. The procedures in FIG. 1 are performed by a posture estimation device that estimates the posture of an object to which an IMU is attached, for example. The object is not particularly limited, and for example, a vehicle, an electronic device, exercise equipment, a person, and an animal may be provided as the object. The IMU may be detachable from the object. The IMU may be provided in a state where the IMU is fixed to the object, and thus detaching the IMU is not possible, for example, the IMU is mounted in the object. For example, the posture estimation device may be a personal computer (PC) or may be various portable devices such as a smart phone.

As illustrated in FIG. 1, in the posture estimation method in the embodiment, firstly, the posture estimation device initializes the state vector $x_k$ and the error covariance matrix $\Sigma_{x,k}^2$ as error information (initialization step S1). That is, the posture estimation device sets k=0 and sets (initializes) the state vector $x_0$ and the error covariance matrix $\Sigma_{x,0}^2$ at a time point $t_0$. Specifically, the posture estimation device sets the elements $q_0$, $v_0$, $b_{\omega,0}$, $b_{\alpha,0}$, and $\Delta g_0$ of the state vector $x_0$ and $\Sigma_{q,0}^2$, $\Sigma_{v,0}^2$, $\Sigma_{b\omega,0}^2$, $\Sigma_{b\alpha,0}^2$, and $\sigma_{\Delta g,0}^2$ included in the error covariance matrix $\Sigma_{x,0}^2$, which are expressed as in Expression (30).

For example, the posture estimation device may set the initial posture of the inertial measurement unit (IMU) to have a roll angle, a pitch angle, and a yaw angle which have been determined in advance, and may set $q_0$ by substituting the roll angle, the pitch angle, and the yaw angle into Expression (31). Alternatively, the posture estimation device may acquire acceleration data from the acceleration sensor in a state where the inertial measurement unit (IMU) is stopped. The posture estimation device may specify a direction of the gravitational acceleration from the acceleration data, calculate a roll angle and a pitch angle, and set the yaw angle to a predetermined value (for example, 0). Then, the posture estimation device may set $q_0$ by substituting the roll angle, the pitch angle, and the yaw angle into Expression (31). The inertial measurement unit (IMU) sets $\Sigma_{q,0}^2$ by substituting $RMS\sigma_\varphi$ of a roll angle error and $RMS\sigma_\theta$ of a pitch angle error into Expression (32).

For example, the posture estimation device sets a state where the inertial measurement unit (IMU) is stopped to be an initial state and sets $v_0$ to 0. Then, the posture estimation device sets $\Sigma_{v,0}^2$ by substituting $RMS\sigma_{vx}$, $RMS\sigma_{vy}$, and $RMS\sigma_{vz}$ of the error of the motion velocity vector v in the axes into Expression (33).

If the residual bias $b_\omega$ of the angular velocity sensor and the residual bias $b_\alpha$ of the acceleration sensor are known, the posture estimation device sets the values of the residual biases to $b_{\omega,0}$ and $b_{\alpha,0}$. If $b_\omega$ and $b_\alpha$ are not known, the posture estimation device sets $b_{\omega,0}$ and $b_{\alpha,0}$ to zero. The posture estimation device sets $\Sigma_{b\omega,0}^2$ and $\Sigma_{b\alpha,0}^2$ by substituting the errors $RMS\sigma_{b\omega x}$, $RMS\sigma_{b\omega y}$, and $RMS\sigma_{b\omega z}$ of the residual bias of the angular velocity sensor in the axes and the errors $RMS\sigma_{b\alpha x}$, $RMS\sigma_{b\alpha y}$, and $RMS\sigma_{b\alpha z}$ of the residual bias of the acceleration sensor in the axes into Expression (34).

If the gravitational acceleration value is known, the posture estimation device sets the difference from 1 G to $\Delta g_0$. If the gravitational acceleration value is not known, the posture estimation device sets $\Delta g_0$ to zero. The posture estimation device sets $RMS\sigma_{\Delta g}$ of the error of the gravitational acceleration value in $\sigma_{\Delta g,0}^2$.

Then, the posture estimation device acquires a measured value of the inertial measurement unit (IMU) (measured-value acquisition step S2). Specifically, the posture estimation device waits until the sampling interval $\Delta t$ elapses. If the sampling interval $\Delta t$ elapses, the posture estimation device sets k=k+1 and $t_k = t_{k-1} + \Delta t$ and acquires angular velocity data $d_{\omega,k}$ and acceleration data $d_{\alpha,k}$ from the inertial measurement unit (IMU).

Then, the posture estimation device performs prediction processing (also referred to as time update processing) of the state vector $x_k$ (including the posture quaternion $q_k$ being the posture information at a time point $t_k$, as an element) and the error covariance matrix $\Sigma_{x,k}^2$ being error information at the time point $t_k$ (prediction step S3).

Figure 2:
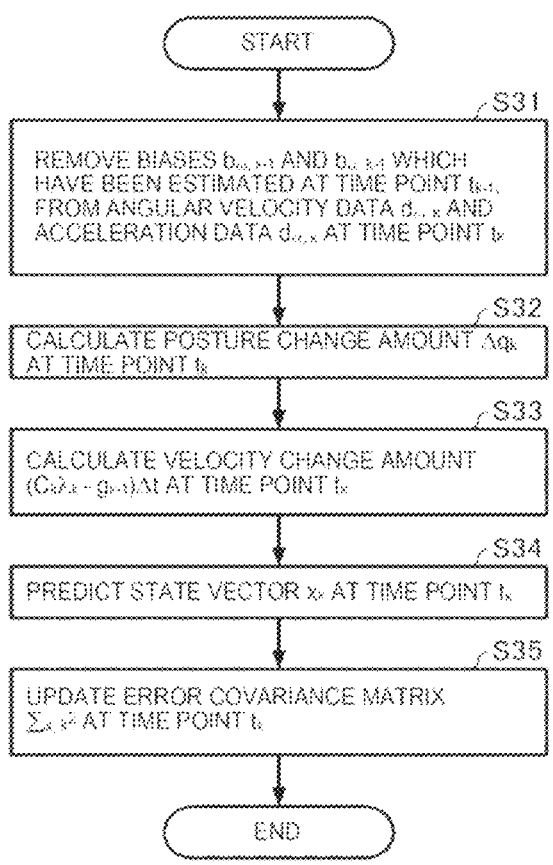
FIG. 2 is a flowchart illustrating an example of procedures of a process S3 in FIG. 1.

FIG. 2 is a flowchart illustrating an example of procedures of the step S3 in FIG. 1. As illustrated in FIG. 2, firstly, the posture estimation device performs processing of removing the residual biases $b_{\omega,k-1}$ and $b_{\alpha,k-1}$ which have been estimated at a time point $t_{k-1}$, from angular velocity data $d_{\omega,k}$ and acceleration data $d_{\alpha,k}$ at the time point $t_k$. The posture estimation device performs the above processing with Expression (19) (bias removal step S31).

Then, the posture estimation device performs processing (posture-change-amount calculation processing) of calculating the posture change amount $\Delta q_k$ at the time point $t_k$ based on the output of the angular velocity sensor (posture-change-amount calculation step S32). Specifically, the posture estimation device calculates the posture change amount $\Delta q_k$ with Expression (6), based on the angular velocity data $d_{\omega,k}$.

The posture estimation device performs processing (velocity-change-amount calculation processing) of calculating the velocity change amount $(C_k \lambda_k - g_{k-1})\Delta t$ of the object based on the output of the acceleration sensor and the output of the angular velocity sensor (velocity-change-amount calculation step S33). Specifically, the posture estimation device calculates the velocity change amount $(C_k \lambda_k - g_{k-1})\Delta t$ with Expressions (9), (10), and (12), based on the acceleration data $d_{\alpha,k}$ and the angular velocity data $d_{\omega,k}$.

The posture estimation device performs processing (posture information prediction processing) of predicting the posture quaternion $q_k$ being posture information of the object at the time point $t_k$, by using the posture change amount $\Delta q_k$ (posture information prediction step S34). In the posture information prediction step S34, the posture estimation device further performs processing (velocity information prediction processing) of predicting the motion velocity vector $v_k$ being velocity information of the object at the time point $t_k$ by using the velocity change amount $(C_k \lambda_k - g_{k-1})\Delta t$. Specifically, in the posture information prediction step S34, the posture estimation device performs processing of predicting the posture quaternion $q_k$ and the state vector $x_k$ including the motion velocity vector $v_k$ as the element, by Expressions (6), (12), and (19).

Lastly, the posture estimation device performs processing of updating the error covariance matrix $\Sigma_{x,k}^2$ at the time point $t_k$ by Expressions (20) and (21) (error information update step S35).

Returning to FIG. 1, the posture estimation device performs processing (rotational error component removal processing) of removing a rotational error component around a reference vector in the error covariance matrix $\Sigma_{x,k}^2$ being the error information (rotational error-component removal step S4). The reference vector is a vector observed by the observation section. In the embodiment, the reference vector is a gravitational acceleration vector observed by the acceleration sensor being the observation section. In the embodiment, a rotation error around the reference vector is an azimuth error. Thus, in the step S4, the posture estimation device performs processing of removing the azimuth error in the error covariance matrix $\Sigma_{x,k}^2$. Specifically, the posture estimation device generates the error covariance matrix $\Sigma_{x,k}^2$ in which the rank limitation and removal of the azimuth error component $\varepsilon_{\theta_z}$ in the error covariance matrix $\Sigma_{q,k}^2$ of the posture quaternion $q_k$ are performed, by Expressions (28) and (29).

The posture estimation device performs processing (bias error limitation processing) of limiting the bias error component of the angular velocity around the reference vector, in the error covariance matrix $\Sigma_{x,k}^2$ being the error information (bias error limitation step S5). As described above, in the embodiment, the reference vector is the gravitational acceleration vector. Thus, in Step S5, the posture estimation device limits the bias error component of the angular velocity around the gravitational acceleration vector, that is, limits the vertical component (yaw-axis component) of the bias error of the angular velocity.

Figure 3:
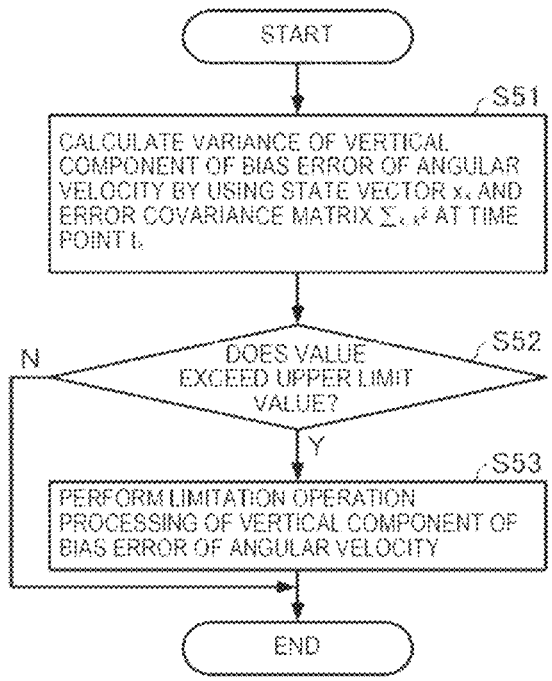
FIG. 3 is a flowchart illustrating an example of procedures of a process S5 in FIG. 1.

FIG. 3 is a flowchart illustrating an example of procedures of the step S5 in FIG. 1. As illustrated in FIG. 3, firstly, the posture estimation device performs processing of calculating the variance $\sigma_{b\omega v}^2$ of the vertical component of the bias error in the angular velocity with Expression (39) and the state vector $x_k$ and the error covariance matrix $\Sigma_{x,k}^2$ at the time point $t_k$ (bias-error vertical component calculation step S51).

Then, the posture estimation device performs processing of determining whether or not the variance $\sigma_{b\omega v}^2$ exceeds the upper limit value (bias error determination step S52).

When the variance $\sigma_{b\omega v}^2$ exceeds the upper limit value (Y in Step S52), the posture estimation device performs limitation operation processing of limiting the vertical component of the bias error in the angular velocity (limitation operation step S53). Specifically, when the variance $\sigma_{b\omega v}^2$ exceeds the upper limit value $\sigma_{b\omega max}^2$, the posture estimation device updates the error covariance matrix $\Sigma_{x,k}^2$ by Expression (40). When the variance $\sigma_{b\omega v}^2$ is equal to or less than the upper limit value (N in Step S52), the posture estimation device does not perform the limitation operation processing in Step S53.

Figure 4:
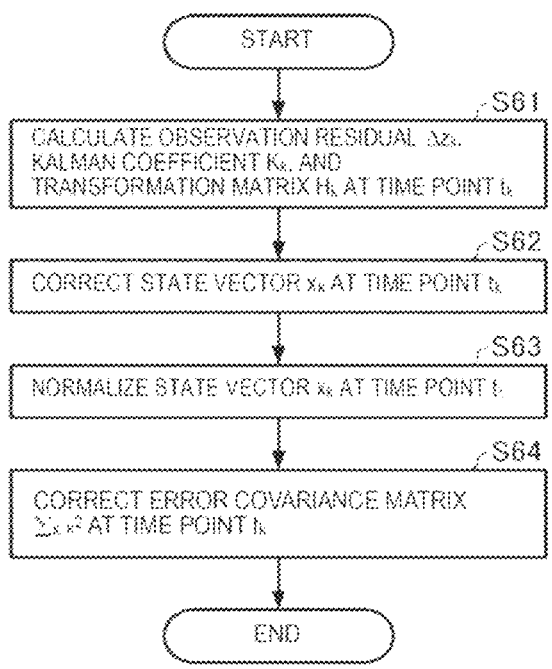
FIG. 4 is a flowchart illustrating an example of procedures of a process S6 in FIG. 1.

Returning to FIG. 1, the posture estimation device performs correction processing (also referred to as observation update processing) of the state vector $x_k$ and the error covariance matrix $\Sigma_{x,k}^2$ at the time point $t_k$ (correction step S6). In the embodiment, the posture estimation device performs processing (posture information correction step) of correcting the posture quaternion $q_k$ being the posture information of the object, which has been predicted in Step S3, based on the error covariance matrix $\Sigma_{x,k}^2$ being the error information, the gravitational acceleration vector being the reference vector, and the output of the acceleration sensor. Specifically, in the posture information correction step, the posture estimation device corrects the state vector $x_k$ including the posture quaternion $q_k$ being the posture information as the element, based on the observation residual $\Delta z_{a,k}$ being a difference between the acceleration vector and the reference vector obtained based on the output of the acceleration sensor. FIG. 4 is a flowchart illustrating an example of procedures of Step S6 in FIG. 1.

As illustrated in FIG. 4, firstly, the posture estimation device performs processing of calculating the observation residual $\Delta z_k$, a Kalman coefficient $K_k$, and a transformation matrix $H_k$ at the time point $t_k$ by Expressions (23) and (24) (correction coefficient calculation step S61).

Then, the posture estimation device performs processing (posture information correction processing) of correcting the posture quaternion $q_k$ being the predicted posture information of the object at the time point $t_k$ (posture information correction step S62). Specifically, the posture estimation device performs processing of correcting the state vector $x_k$ at the time point $t_k$ with Expression (27), the observation residual $\Delta z_k$, and the Kalman coefficient $K_k$.

The posture estimation device performs processing of normalizing the state vector $x_k$ at the time point $t_k$ by Expression (28) (normalization step S63).

Then, the posture estimation device performs processing of correcting the error covariance matrix $\Sigma_{x,k}^2$ at the time point $t_k$ with Expression (27), the Kalman coefficient $K_k$, and the transformation matrix $H_k$ (error information correction step S64).

Returning to FIG. 1, the posture estimation device repeats the processes of Step S2 to Step S6 until an end instruction is received (N in Step S7). If the end instruction is received (Y in Step S7), the posture estimation device ends the processing.

The order of the steps in FIG. 1 can be appropriately changed. For example, the order of Step S4 and Step S5 may be changed, and at least one of Step S4 and Step S5 may be performed after Step S6.

As described above, according to the posture estimation method in the embodiment, the posture change amount and the velocity change amount of an object are calculated with Expressions (6) and (12) derived from Expressions (1) and (2) of the output model of the IMU. Then, the posture of the object is estimated with the posture change amount and the velocity change amount. In Expressions (6) and (12), a calculation error in the posture change amount or the velocity change amount is reduced in comparison to that in the related art, by calculating the posture change amount and the velocity change amount with not only the first-order term of $\Delta t$ but also the second-order term and the third-order term thereof.

If the object rotates, the coordinate transformation matrix $C_k$ changes. However, the coordinate transformation matrix $C_k$ is calculated from the elements of the posture quaternion $q_k$ estimated by the Kalman filter. Thus, when the object rotates rapidly, the coordinate transformation matrix $C_k$ may not immediately follow the rotation of the object. Regarding this, according to the posture estimation method in the embodiment, since the acceleration $\lambda_k$ is calculated with not only the acceleration but also the angular velocity in Expression (12), the rotation of the object is immediately reflected to the acceleration $\lambda_k$. Thus, even when the object rotates rapidly, it is possible to reduce deterioration of calculation accuracy of the velocity change amount.

Further, according to the posture estimation method in the embodiment, with Expression (23), the observation residual of the gravitational acceleration by the output of the acceleration sensor and the motion velocity of the object become zero in a long term, and the Kalman coefficient $K_k$ in Expression (24) is calculated with the observation residual of the zero motion velocity. Thus, even though observation information of the azimuth is not provided, it is possible to estimate the posture of the object with high accuracy.

Since information regarding the azimuth of the object is not included in the output of the angular velocity sensor and the output of the acceleration sensor, the azimuth error of the object is not corrected. However, if the azimuth error included in the updated posture error remains, reliability of the azimuth error is monotonously reduced, and the posture error monotonously increases. Thus, the estimation accuracy of the posture may be deteriorated. Regarding this, according to the posture estimation method in the embodiment, the azimuth error included in the posture error of the object, which has been updated by using the output of an angular velocity sensor 12 and the output of an acceleration sensor 14 is removed by Expression (17). Thus, it is possible to reduce a concern of monotonously increasing the posture error and to reduce a concern of decreasing the estimation accuracy of the posture.

The output of the angular velocity sensor and the output of the acceleration sensor do not include the information regarding the azimuth of the object. Thus, for example, when the object continues in the substantially same posture for a long term, the vertical component of the updated bias error of the angular velocity sensor monotonously increases, and the Kalman coefficient $K_k$ becomes too large. Consequently, there is a concern of deteriorating the estimation accuracy of the posture. Regarding this, according to the posture estimation method in the embodiment, when the vertical component of the bias error in the angular velocity sensor exceeds the upper limit value, the vertical component of the bias error is limited to the upper limit value by Expression (40). Thus, it is possible to reduce a concern of increasing the Kalman coefficient $K_k$ too large and to reduce a concern of decreasing the estimation accuracy of the posture.

With the above descriptions, according to the posture estimation method in the embodiment, it is possible to reduce a concern of decreasing the estimation accuracy of the posture of the object even when the posture of the object changes small and to estimate the posture of the object with sufficient accuracy.

2. Posture Estimation Device

2-1. Configuration of Posture Estimation Device

Figure 5:
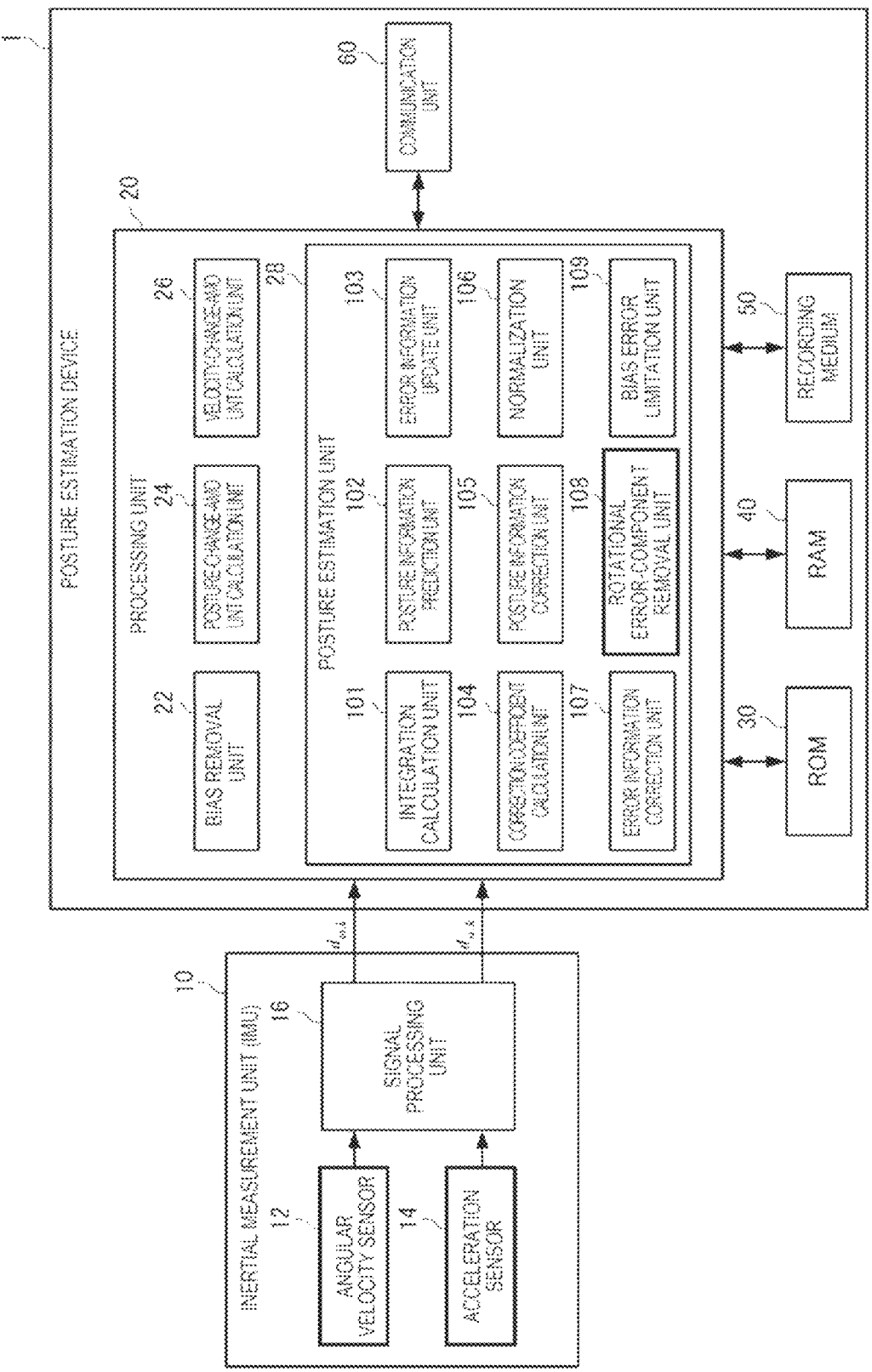
FIG. 5 is a diagram illustrating an example of a configuration of a posture estimation device according to the embodiment.

FIG. 5 is a diagram illustrating an example of a configuration of the posture estimation device in the embodiment. As illustrated in FIG. 5, in the embodiment, a posture estimation device 1 includes a processing unit 20, a ROM 30, a RAM 40, a recording medium 50, and a communication unit 60. The posture estimation device 1 estimates the posture of an object based on an output of an inertial measurement unit (IMU) 10. In the embodiment, the posture estimation device 1 may have a configuration obtained by changing or removing some components or by adding another component.

As illustrated in FIG. 5, in the embodiment, the posture estimation device 1 is separated from the IMU 10. However, the posture estimation device 1 may include the IMU 10. The IMU 10 and the posture estimation device 1 may be accommodated in one casing. The IMU 10 may be separated or separable from the main body in which the posture estimation device 1 is accommodated. In the former case, the posture estimation device 1 is mounted on an object. In the latter case, the IMU 10 is mounted on the object.

In the embodiment, the IMU 10 includes the angular velocity sensor 12, the acceleration sensor 14, and a signal processing unit 16. In the embodiment, the IMU 10 may have a configuration obtained by changing or removing some components or by adding another component.

The angular velocity sensor 12 measures an angular velocity in each of directions of three axes which intersect with each other, in ideal, are perpendicular to each other. The angular velocity sensor 12 outputs an analog signal depending on the magnitude and the orientation of the measured three-axis angular velocity.

The acceleration sensor 14 measures an acceleration in each of directions of three axes which intersect with each other, in ideal, are perpendicular to each other. The acceleration sensor 14 outputs an analog signal depending on the magnitude and the orientation of the measured three-axis acceleration.

The signal processing unit 16 performs processing of performing sampling of an output signal of the angular velocity sensor 12 at a predetermined sampling interval $\Delta t$ to convert the output signal into angular velocity data having a digital value. The signal processing unit 16 performs processing of performing sampling of an output signal of the acceleration sensor 14 at a predetermined sampling interval $\Delta t$ to convert the output signal into acceleration data having a digital value.

Ideally, the angular velocity sensor 12 and the acceleration sensor 14 are attached to the IMU 10 such that the three axes coincide with three axes (x-axis, y-axis, and z-axis) of the sensor coordinate system which is an orthogonal coordinate system defined for the IMU 10. However, in practice, an error occurs in a mounting angle. Thus, the signal processing unit 16 performs processing of converting the angular velocity data and the acceleration data into data in an xyz coordinate system, by using a correction parameter which has been, in advance, calculated in accordance with the error in the mounting angle. The signal processing unit 16 also performs processing of correcting the temperature in the angular velocity data and the acceleration data in accordance with temperature characteristics of the angular velocity sensor 12 and the acceleration sensor 14.

A function of A/D conversion or temperature correction may be embedded in the angular velocity sensor 12 and the acceleration sensor 14.

The IMU 10 outputs angular velocity data $d_\omega$ and acceleration data $d_\alpha$ after the processing by the signal processing unit 16 to the processing unit 20 of the posture estimation device 1.

The ROM 30 stores programs used when the processing unit 20 performs various types of processing, and various programs or various types of data for realizing application functions, for example.

The RAM 40 is a storage unit that is used as a work area of the processing unit 20, and temporarily stores a program or data read out from the ROM 30 or operation results obtained by the processing unit 20 performing processing in accordance with various programs, for example.

The recording medium 50 is a non-volatile storage unit that stores data required to be preserved for a long term among pieces of data generated by processing of the processing unit 20. The recording medium 50 may store programs used when the processing unit 20 performs various types of processing, and various programs or various types of data for realizing application functions, for example.

The processing unit 20 performs various types of processing in accordance with the program stored in the ROM 30 or the recording medium 50 or in accordance with the program which is received from a server via a network and then is stored in the RAM 40 or the recording medium 50. In particular, in the embodiment, the processing unit 20 executes the program to function as a bias removal unit 22, a posture-change-amount calculation unit 24, a velocity-change-amount calculation unit 26, and a posture estimation unit 28. Thus, the processing unit 20 performs a predetermined operation on the angular velocity data $d_\omega$ and the acceleration data $d_\alpha$ output at an interval of $\Delta t$ by the IMU 10 so as to perform processing of estimating the posture of the object.

Figure 6:
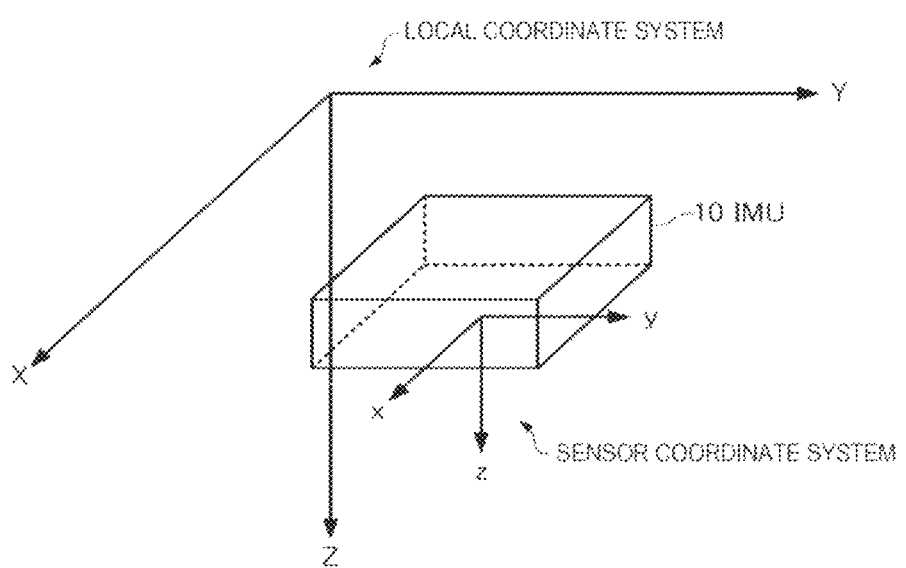
FIG. 6 is a diagram illustrating a sensor coordinate system and a local coordinate system.

In the embodiment, as illustrated in FIG. 6, the sensor coordinate system (xyz coordinate system constituted by the x-axis, the y-axis, and the z-axis which are perpendicular to each other) as the coordinate system of the IMU 10 and a local-space coordinate system (XYZ coordinate system constituted by an X-axis, a Y-axis, and a Z-axis which are perpendicular to each other) as a coordinate system of a space in which the object exists are considered. The processing unit 20 estimates the posture of the object (may also be referred to as the posture of the IMU 10) in the local-space coordinate system from the three-axis angular velocity and the three-axis acceleration in the sensor coordinate system, which are output from the IMU 10 mounted on the object.

The bias removal unit 22 performs processing of calculating the three-axis angular velocity obtained by removing a bias error from the output of the angular velocity sensor 12 and performs processing of calculating the three-axis acceleration obtained by removing a bias error from the output of the acceleration sensor 14.

The posture-change-amount calculation unit 24 calculates the posture change amount of the object based on the output of the angular velocity sensor 12. Specifically, the posture-change-amount calculation unit 24 performs processing of calculating the posture change amount of the object by approximation with a polynomial expression in which the sampling interval $\Delta t$ is used as a variable. The posture-change-amount calculation unit 24 performs the processing with the three-axis angular velocity in which the bias error has been removed by the bias removal unit 22.

The velocity-change-amount calculation unit 26 calculates the velocity change amount of the object based on the output of the acceleration sensor 14 and the output of the angular velocity sensor 12. Specifically, the velocity-change-amount calculation unit 26 performs processing of calculating the velocity change amount of the object with the three-axis angular velocity and the three-axis acceleration in which the bias error has been removed by the bias removal unit 22.

The posture estimation unit 28 functions as an integration calculation unit 101, a posture information prediction unit 102, an error information update unit 103, a correction coefficient calculation unit 104, a posture information correction unit 105, a normalization unit 106, an error information correction unit 107, a rotational error-component removal unit 108, and a bias error limitation unit 109. The posture estimation unit 28 performs processing of estimating the posture of the object with the posture change amount calculated by the posture-change-amount calculation unit 24 and the velocity change amount calculated by the velocity-change-amount calculation unit 26. In practice, the posture estimation unit 28 performs processing of estimating a state vector x defined in Expression (18) and an error covariance matrix $\Sigma_x^2$ thereof with an extended Kalman filter.

The integration calculation unit 101 performs integration processing of integrating the posture change amount calculated by the posture-change-amount calculation unit 24 with the previous estimated value of the posture, which has been corrected by the posture information correction unit 105 and normalized by the normalization unit 106. The integration calculation unit 101 performs integration processing of integrating the velocity change amount calculated by the velocity-change-amount calculation unit 26 with the previous estimated value of the velocity, which has been corrected by the posture information correction unit 105 and normalized by the normalization unit 106.

The posture information prediction unit 102 performs processing of predicting posture quaternion q as posture information of the object, with the posture change amount calculated by the posture-change-amount calculation unit 24. The posture information prediction unit 102 also performs processing of predicting a motion velocity vector v as velocity information of the object, based on the velocity change amount calculated by the velocity-change-amount calculation unit 26. In practice, the posture information prediction unit 102 performs processing of predicting the state vector x including the posture quaternion q and the motion velocity vector v as elements.

The error information update unit 103 performs processing of updating the error covariance matrix $\Sigma_x^2$ as error information, based on the output of the angular velocity sensor 12. Specifically, the error information update unit 103 performs processing of updating a posture error of the object with the three-axis angular velocity in which the bias error has been removed by the bias removal unit 22. In practice, the error information update unit 103 performs processing of updating the error covariance matrix $\Sigma_x^2$ with the extended Kalman filter.

The rotational error-component removal unit 108 performs processing of removing a rotational error component around a reference vector, in the error covariance matrix $\Sigma_x^2$ being the error information. Specifically, the rotational error-component removal unit 108 performs processing of removing an azimuth error component included in the posture error in the error covariance matrix $\Sigma_x^2$ updated by the error information update unit 103. In practice, the rotational error-component removal unit 108 performs processing of generating the error covariance matrix $\Sigma_x^2$ in which the rank limitation and removal of the azimuth error component are performed in the error covariance matrix $\Sigma_q^2$ of the posture, on the error covariance matrix $\Sigma_x^2$.

The bias error limitation unit 109 performs processing of limiting a bias error component of an angular velocity around the reference vector, in the error covariance matrix $\Sigma_x^2$ being the error information. Specifically, the bias error limitation unit 109 performs processing of limiting a vertical component of the bias error of the angular velocity, in the error covariance matrix $\Sigma_x^2$ generated by the rotational error-component removal unit 108. In practice, the bias error limitation unit 109 performs processing as follows. That is, the bias error limitation unit 109 determines whether or not the vertical component of the bias error of the angular velocity exceeds an upper limit value. When the vertical component exceeds the upper limit value, the bias error limitation unit 109 generates the error covariance matrix $\Sigma_x^2$ in which limitation is applied such that the vertical component has the upper limit value.

The correction coefficient calculation unit 104 performs processing of calculating correction coefficients based on the error covariance matrix $\Sigma_x^2$ which has been generated by the bias error limitation unit 109 and is the error information. The correction coefficients are used for determining the correction amount of the posture information (posture quaternion q) or the velocity information (motion velocity vector v) of the object by the posture information correction unit 105 and the correction amount of the error information (error covariance matrix $\Sigma x$) by the error information correction unit 107. In practice, the correction coefficient calculation unit 104 performs processing of calculating an observation residual $\Delta z$, a Kalman coefficient K, and a transformation matrix H.

The posture information correction unit 105 performs processing of correcting the posture information (posture quaternion q) of the object, which has been predicted by the posture information prediction unit 102, based on the error covariance matrix $\Sigma_x$ being the error information, the gravitational acceleration vector g being the reference vector, and the output of the acceleration sensor 14 being the reference observation sensor. Specifically, the posture information correction unit 105 performs processing of correcting the posture quaternion q with the error covariance matrix $\Sigma_x$ generated by the bias error limitation unit 109, and the Kalman coefficient K and the observation residual $\Delta z_a$ of the gravitational acceleration calculated by the correction coefficient calculation unit 104 based on the gravitational acceleration vector g and the acceleration vector $\alpha$ (obtained based on the output of the acceleration sensor 14). In practice, the posture information correction unit 105 performs processing of correcting the state vector x predicted by the posture information prediction unit 102, with the extended Kalman filter.

The normalization unit 106 performs processing of normalizing the posture information (posture quaternion q) of the object, which has been corrected by the posture information correction unit 105 such that the magnitude thereof does not change. In practice, the normalization unit 106 performs processing of normalizing the state vector x corrected by the posture information correction unit 105.

The error information correction unit 107 performs processing of correcting the error covariance matrix $\Sigma_x$ being the error information. Specifically, the error information correction unit 107 performs processing of correcting the error covariance matrix $\Sigma_x$ generated by the bias error limitation unit 109 with the extended Kalman filter, and the transformation matrix H and the Kalman coefficient K calculated by the correction coefficient calculation unit 104.

The posture information (posture quaternion q) of the object, which has been estimated by the processing unit 20 can be transmitted to another device via the communication unit 60.

2-2. Configuration of Processing Unit

Figure 7:
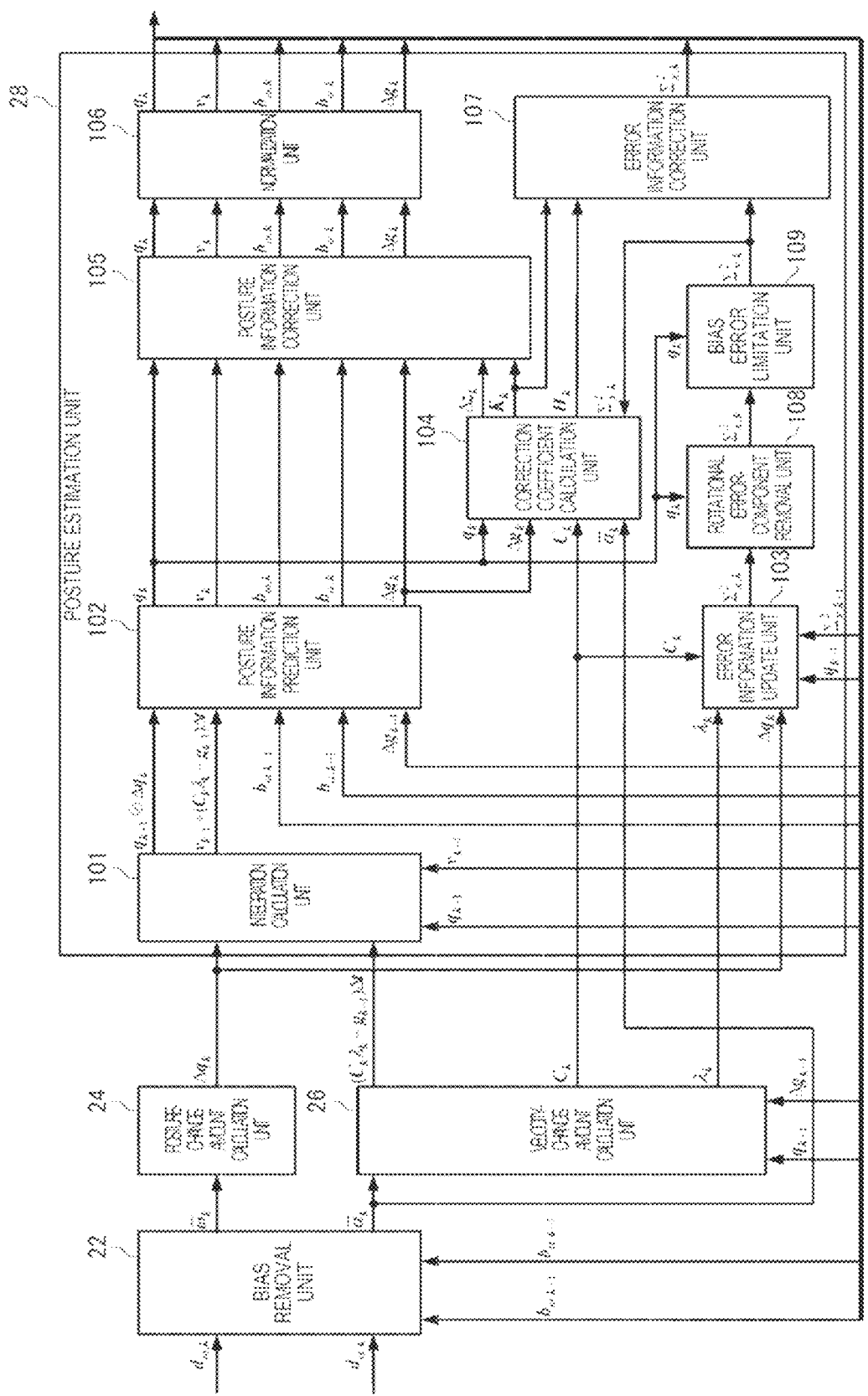
FIG. 7 is a diagram illustrating an example of a configuration of a processing unit in the embodiment.

FIG. 7 is a diagram illustrating a specific example of a configuration of the processing unit 20. In FIG. 7, components as same as those in FIG. 5 are denoted by the same reference signs. As illustrated in FIG. 7, angular velocity data $d_{\omega, k}$ and acceleration data $d_{\alpha, k}$ at a time point $t_k$, which are output by the IMU 10 are input to the bias removal unit 22. As shown in Expression (1), the angular velocity data $d_{\omega, k}$ is represented by the sum of the average value of the angular velocity vector $\omega$ in a period from a time point $t_{k-1}$ to the time point $t_k$ and the residual bias $b_\omega$ of the angular velocity sensor 12. Similarly, as shown in Expression (2), the acceleration data $d_{\alpha, k}$ is represented by the sum of the average value of the acceleration vector $\alpha$ in the period from the time point $t_{k-1}$ to the time point $t_k$ and the residual bias $b_\alpha$ of the acceleration sensor 14.

The bias removal unit 22 calculates the average value of the angular velocity vector $\omega$ in the period from the time point $t_{k-1}$ to the time point $t_k$ by Expression (19) in a manner of subtracting the residual bias $b_{\omega, k-1}$ at the time point $t_{k-1}$ from the angular velocity data $d_{\omega, k}$ at the time point $t_k$. The bias removal unit 22 calculates the average value of the acceleration vector $\alpha$ in the period from the time point $t_{k-1}$ to the time point $t_k$ by Expression (19) in a manner of subtracting the residual bias $b_{\alpha, k-1}$ at the time point $t_{k-1}$ from the acceleration data $d_{\alpha, k}$ at the time point $t_k$.

The posture-change-amount calculation unit 24 calculates the approximation of the posture change amount $\Delta q_k$ at the time point $t_k$ by substituting the average value of the angular velocity vector $\omega$ in the period from the time point $t_{k-1}$ to the time point $t_k$ and the average value of the angular velocity vector $\omega$ in a period from a time point $t_{k-2}$ to the time point $t_{k-1}$ into the polynomial expression of Expression (6). The above-described average values of the angular velocity vector $\omega$ have been calculated by the bias removal unit 22.

The velocity-change-amount calculation unit 26 calculates a coordinate transformation matrix $C_k$ at the time point $t_k$ from posture quaternion $q_{k-1}$ at the time point $t_{k-1}$ with Expression (9). The velocity-change-amount calculation unit 26 calculates the approximation of the acceleration $\lambda_k$ at the time point $t_k$ by substituting the average value of the acceleration vector $\alpha$ and the average value of the angular velocity vector $\omega$ in the period from the time point $t_{k-1}$ to the time point $t_k$, and the average value of the acceleration vector $\alpha$ and the average value of the angular velocity vector $\omega$ in the period from the time point $t_{k-2}$ to the time point $t_{k-1}$ into the polynomial expression of Expression (12). The above-described average values of the angular velocity vector $\omega$ and the acceleration vector $\alpha$ have been calculated by the bias removal unit 22. The velocity-change-amount calculation unit 26 calculates a gravitational acceleration vector $g_{k-1}$ at the time point $t_{k-1}$ by substituting a gravitational-acceleration correction value $\Delta g_{k-1}$ at the time point $t_{k-1}$ into Expression (10). The velocity-change-amount calculation unit 26 calculates the velocity change amount $(C_k \lambda_k - g_{k-1})\Delta t$ at the time point $t_k$ from the coordinate transformation matrix $C_k$, the acceleration $\lambda_k$, and the gravitational acceleration vector $g_{k-1}$, which have been calculated.

As illustrated in FIG. 7, the posture estimation unit 28 includes the integration calculation unit 101, the posture information prediction unit 102, the error information update unit 103, the correction coefficient calculation unit 104, the posture information correction unit 105, the normalization unit 106, the error information correction unit 107, the rotational error-component removal unit 108, and the bias error limitation unit 109. The posture estimation unit 28 estimates the state vector x and the error covariance matrix $\Sigma_{x, k}^2$ at the time point $t_k$ with the extended Kalman filter.

The integration calculation unit 101 performs quaternion multiplication of the posture quaternion $q_{k-1}$ at the time point $t_{k-1}$ and the posture change amount $\Delta q_k$ at the time point $t_k$, which has been calculated by the posture-change-amount calculation unit 24, with Expression (6). The integration calculation unit 101 adds a motion velocity vector $v_{k-1}$ at the time point $t_{k-1}$ and the velocity change amount $(C_k \lambda_k - g_{k-1})\Delta t$ at the time point $t_k$, which has been calculated by the velocity-change-amount calculation unit 26, with Expression (12).

The posture information prediction unit 102 predicts the posture quaternion $q_k$, the motion velocity vector $v_k$, the residual bias $b_{\omega, k}$ of the angular velocity sensor 12, the residual bias $b_{\alpha, k}$ of the acceleration sensor 14, and the gravitational-acceleration correction value $\Delta g_k$ which are elements of the state vector $x_k$, with Expression (19). Specifically, the posture information prediction unit 102 predicts the posture quaternion $q_k$ as a result of the quaternion multiplication of the posture quaternion $q_{k-1}$ and the posture change amount $\Delta q_k$ by the integration calculation unit 101. The posture information prediction unit 102 predicts the motion velocity vector $v_k$ as a result of adding the motion velocity vector $v_{k-1}$ and the velocity change amount $(C_k \lambda_k - g_{k-1})\Delta t$ by the integration calculation unit 101. The posture information prediction unit 102 predicts the residual bias $b_{\omega, k}$ of the angular velocity sensor 12 to be the residual bias $b_{\omega, k-1}$ of the angular velocity sensor 12 at the time point $t_{k-1}$. The posture information prediction unit 102 predicts the residual bias $b_{\alpha, k}$ of the acceleration sensor 14 to be the residual bias $b_{\alpha, k-1}$ of the acceleration sensor 14 at the time point $t_{k-1}$. The posture information prediction unit 102 predicts the gravitational-acceleration correction value $\Delta g_k$ to be the gravitational-acceleration correction value $\Delta g_{k-1}$ at the time point $t_{k-1}$.

The error information update unit 103 updates the error covariance matrix $\Sigma_{x, k}^2$ at the time point $t_k$ with Expressions (20) and (21). The error information update unit 103 performs the update with the posture change amount $\Delta q_k$ calculated by the posture-change-amount calculation unit 24, the acceleration $\lambda_k$ and the coordinate transformation matrix $C_k$ calculated by the velocity-change-amount calculation unit 26, the posture quaternion $q_{k-1}$ at the time point $t_{k-1}$, and the error covariance matrix $\Sigma_{x, k-1}^2$ at the time point $t_{k-1}$.

The rotational error-component removal unit 108 calculates a matrix $D'TD'$ with the posture quaternion $q_k$ predicted by the posture information prediction unit 102, by Expression (29). The rotational error-component removal unit 108 updates the error covariance matrix $\Sigma_{x, k}^2$ updated by the error information update unit 103, with Expression (28) and the matrix $D'^TD'$. Thus, the error covariance matrix $\Sigma_{x, k}^2$ in which the rank of the error covariance matrix $\Sigma_{q, k}^2$ of the posture quaternion $q_k$ is limited to 3, and an azimuth error component $\varepsilon_{\theta z}$ has been removed from the error covariance matrix $\Sigma_{q, k}^2$ is generated.

The bias error limitation unit 109 calculates the variance $\sigma_{b\omega v}^2$ of the vertical component of the bias error in the angular velocity sensor 12 with the posture quaternion $q_k$ predicted by the posture information prediction unit 102 and the error covariance matrix $\Sigma_{x, k}^2$ generated by the rotational error-component removal unit 108, by Expression (39). When the variance $\sigma_{b\omega v}^2$ exceeds the upper limit value $\sigma_{b\omega max}^2$, the bias error limitation unit 109 updates the error covariance matrix $\Sigma_{x, k}^2$ generated by the rotational error-component removal unit 108, by Expression (40). Thus, in the error covariance matrix $\Sigma_{x, k}^2$, the variance $\sigma_{b\omega v}^2$ of the vertical component of the bias error in the angular velocity sensor 12 is limited to the upper limit value $\sigma_{b\omega max}^2$.

The correction coefficient calculation unit 104 calculates the observation residual $\Delta z_k$, the transformation matrix $H_k$, and the Kalman coefficient $K_k$ at the time point $t_k$ with Expressions (23) to (26). The correction coefficient calculation unit 104 performs the calculation with the error covariance matrix $\Sigma_{x, k}^2$ generated by the bias error limitation unit 109, the coordinate transformation matrix $C_k$ calculated by the velocity-change-amount calculation unit 26, the average value of the acceleration vector $\alpha$ calculated by the bias removal unit 22 in the period from the time point $t_{k-1}$ to the time point $t_k$, and the posture quaternion $q_k$ and the gravitational-acceleration correction value $\Delta g_k$ predicted by the posture information prediction unit.

The posture information correction unit 105 corrects the elements (posture quaternion $q_k$, motion velocity vector $v_k$, residual bias $b_{\omega, k}$ of the angular velocity sensor 12, residual bias $b_{\alpha, k}$ of the acceleration sensor 14, and gravitational-acceleration correction value $\Delta g_k$) of the state vector $x_k$ predicted by the posture information prediction unit 102. The posture information correction unit 105 performs the correction by Expression (27) with the observation residual $\Delta z_k$ and the Kalman coefficient $K_k$ calculated by the correction coefficient calculation unit 104.

The normalization unit 106 normalizes the elements (posture quaternion $q_k$, motion velocity vector $v_k$, residual bias $b_{\omega, k}$ of the angular velocity sensor 12, residual bias $b_{\alpha, k}$ of the acceleration sensor 14, and gravitational-acceleration correction value $\Delta g_k$) of the state vector $x_k$ corrected by the posture information correction unit 105, with Expression (28).

The error information correction unit 107 corrects the error covariance matrix $\Sigma_{x, k}^2$ generated by the bias error limitation unit 109 by Expression (27) with the transformation matrix $H_k$ and the Kalman coefficient $K_k$ calculated by the correction coefficient calculation unit 104.

If the next sampling interval $\Delta t$ has elapsed, the state vector $x_k$ calculated by the normalization unit 106 and the error covariance matrix $\Sigma_{x, k}^2$ corrected by the error information correction unit 107 are fed back to the bias removal unit 22, the velocity-change-amount calculation unit 26, the integration calculation unit 101, the posture information prediction unit 102, and the error information update unit 103 in a state of being set to be the state vector $x_{k-1}$ and the error covariance matrix $\Sigma_{x, k-1}^2$ at the time point $t_{k-1}$.

The processing unit 20 described above performs posture estimation processing of estimating the posture of the object, for example, in accordance with the procedures illustrated in FIGS. 1 to 4.

According to the above-described posture estimation device 1 in the embodiment, the processing unit 20 estimates the posture of an object in accordance with the procedures illustrated in FIGS. 1 to 4. Thus, even when the posture of the object changes small, it is possible to reduce a concern of decreasing the estimation accuracy of the posture of the object and to estimate the posture of the object with sufficient accuracy. In addition, according to the posture estimation device 1 in the embodiment, it is possible to exhibit effects similar to those in the above-described posture estimation method in the embodiment.

3. Modification Examples

In the above-described embodiment, the angular velocity sensor and the acceleration sensor are integrated by being accommodated in one inertial measurement unit (IMU). However, the angular velocity sensor and the acceleration sensor may be provided to be individual from each other.

In the above-described embodiment, the posture estimation device outputs only posture information of the object. However, the posture estimation device may output another kind of information. For example, the posture estimation device may output position information of the object, which is obtained by integrating the velocity information or the motion velocity vector $v_k$ of the object based on the motion velocity vector $v_k$ at the time point $t_k$.

In the above-described embodiment, the acceleration sensor and the angular velocity sensor update the outputs at the same sampling interval $\Delta t$. However, the sampling interval Δt$_a$ of the acceleration sensor may be different from the sampling interval Δt$_\omega$ of the angular velocity sensor. In this case, the prediction processing (time update processing) of the state vector and the error covariance matrix in Step S3 in FIG. 1 may be performed for each Δt$_\omega$, and correction processing (observation update processing) of the state vector and the error covariance matrix in Step S6 in FIG. 1 may be performed for each Δt$_a$. The rotational error-component removal processing in Step S4 in FIG. 1 and the bias error limitation processing in Step S5 in FIG. 1 may be performed for each Δt$_\omega$, for each Δt$_a$, or performed in a period different from Δt$_\omega$ or Δt$_a$.

In the above-described embodiment, the posture estimation device estimates the posture of an object by using the gravitational acceleration vector observed by the acceleration sensor as the reference vector, and by using the output of the angular velocity sensor and the reference vector. However, the reference vector may not be the gravitational acceleration vector. For example, when the posture estimation device estimates the posture of an object by using the angular velocity sensor and a geomagnetic sensor, the reference vector may be a geomagnetic vector (vector directed toward the north) observed by using a geomagnetic sensor. For example, when the posture estimation device estimates the posture of a satellite as an object by the angular velocity sensor and a star tracker, the reference vector may be a vector which is directed from the object toward a fixed star and is observed by the star tracker. The acceleration sensor, the geomagnetic sensor, and the star tracker are examples of a reference observation sensor that observes the reference vector.

In the above-described embodiment, the posture information of an object is expressed in quaternion. However, the posture information may be information expressed by a roll angle, a pitch angle, and a yaw angle or may be a posture transformation matrix.

In the above-described embodiment, the state vector x$_k$ includes the posture quaternion q$_k$, the motion velocity vector v$_k$, the residual bias b$_{\omega, k}$ of the angular velocity sensor, the residual bias b$_{\alpha, k}$ of the acceleration sensor, and the gravitational-acceleration correction value Δg$_k$, as the elements. However, the state vector x$_k$ is not limited thereto. For example, the state vector x$_k$ may include the posture quaternion q$_k$, the residual bias b$_{\omega, k}$ of the angular velocity sensor, the residual bias b$_{\alpha, k}$ of the acceleration sensor, and the gravitational-acceleration correction value Δg$_k$, as the elements, and may not include the motion velocity vector v$_k$.

4. Electronic Device

Figure 8:
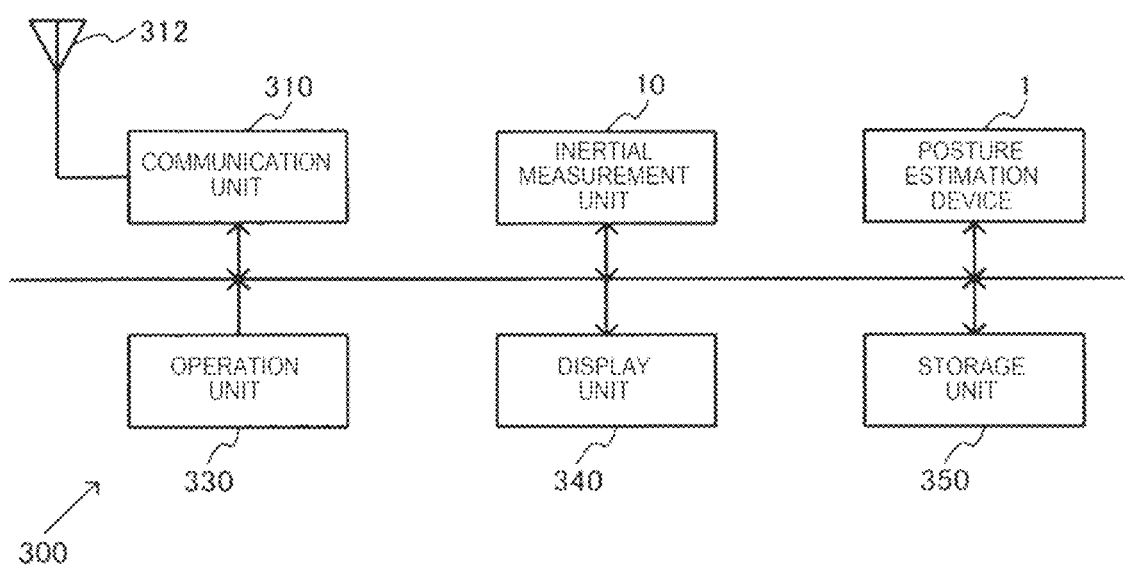
FIG. 8 is a block diagram illustrating an example of a configuration of an electronic device in the embodiment.

FIG. 8 is a block diagram illustrating an example of a configuration of an electronic device 300 in the embodiment. The electronic device 300 includes the posture estimation device 1 and the inertial measurement unit 10 in the above embodiment. The electronic device 300 can include a communication unit 310, an operation unit 330, a display unit 340, a storage unit 350, and an antenna 312.

The communication unit 310 is, for example, a wireless circuit. The communication unit 310 performs processing of receiving data from the outside of the device or transmitting data to the outside thereof, via the antenna 312.

The posture estimation device 1 performs processing based on the output signal of the inertial measurement unit 10. Specifically, the posture estimation device 1 performs processing of estimating the posture of the electronic device 300 based on an output signal (output data) such as detection data of the inertial measurement unit 10. The posture estimation device 1 may perform signal processing such as correction processing or filtering on the output signal (output data) such as detection data of the inertial measurement unit 10. In addition, based on the output signals, the posture estimation device 1 may perform various types of control processing for the electronic device 300, such as control processing of the electronic device 300 or various types of digital processing of data transmitted or received via the communication unit 310. The function of the posture estimation device 1 can be realized by a processor such as an MPU or a CPU, for example.

The operation unit 330 is used when a user performs an input operation. The operation unit 330 can be realized by an operation button, a touch panel display, or the like.

The display unit 340 displays various types of information and can be realized by a display of liquid crystal, organic EL, or the like. The storage unit 350 stores data. The function of the storage unit 350 can be realized by a semiconductor memory such as a RAM or a ROM.

The electronic device 300 in the embodiment can be applied to, for example, an image-related device (such as a digital still camera or a video camera), an in-vehicle device, a wearable device (such as a head mounted display device or a watch-related device), an ink jet discharge device, a robot, a personal computer, a portable information terminal, a printing device, and a projection device. The in-vehicle device includes a car navigation device or a device for automatic driving, for example. The watch-related device includes a watch or a smart watch, for example. For example, an ink jet printer is provided as the ink jet discharge device. The portable information terminal includes a smart phone, a portable phone, a portable game device, a notebook PC, or a tablet terminal, for example. The electronic device 300 in the embodiment can also be applied to an electronic notebook, an electronic dictionary, a calculator, a word processor, a workstation, a videophone, a television monitor for crime prevention, electronic binoculars, a POS terminal, a medical device, a fish finder, a measuring device, and a device for a base station of a mobile terminal, instruments, a flight simulator, and a network server, for example. The medical device includes an electronic thermometer, a sphygmomanometer, a blood glucose meter, an electrocardiogram measuring device, an ultrasonic diagnostic device, an electronic endoscope, and the like. The instruments are instruments of vehicles, aircraft, ships, and the like.

Figure 9:
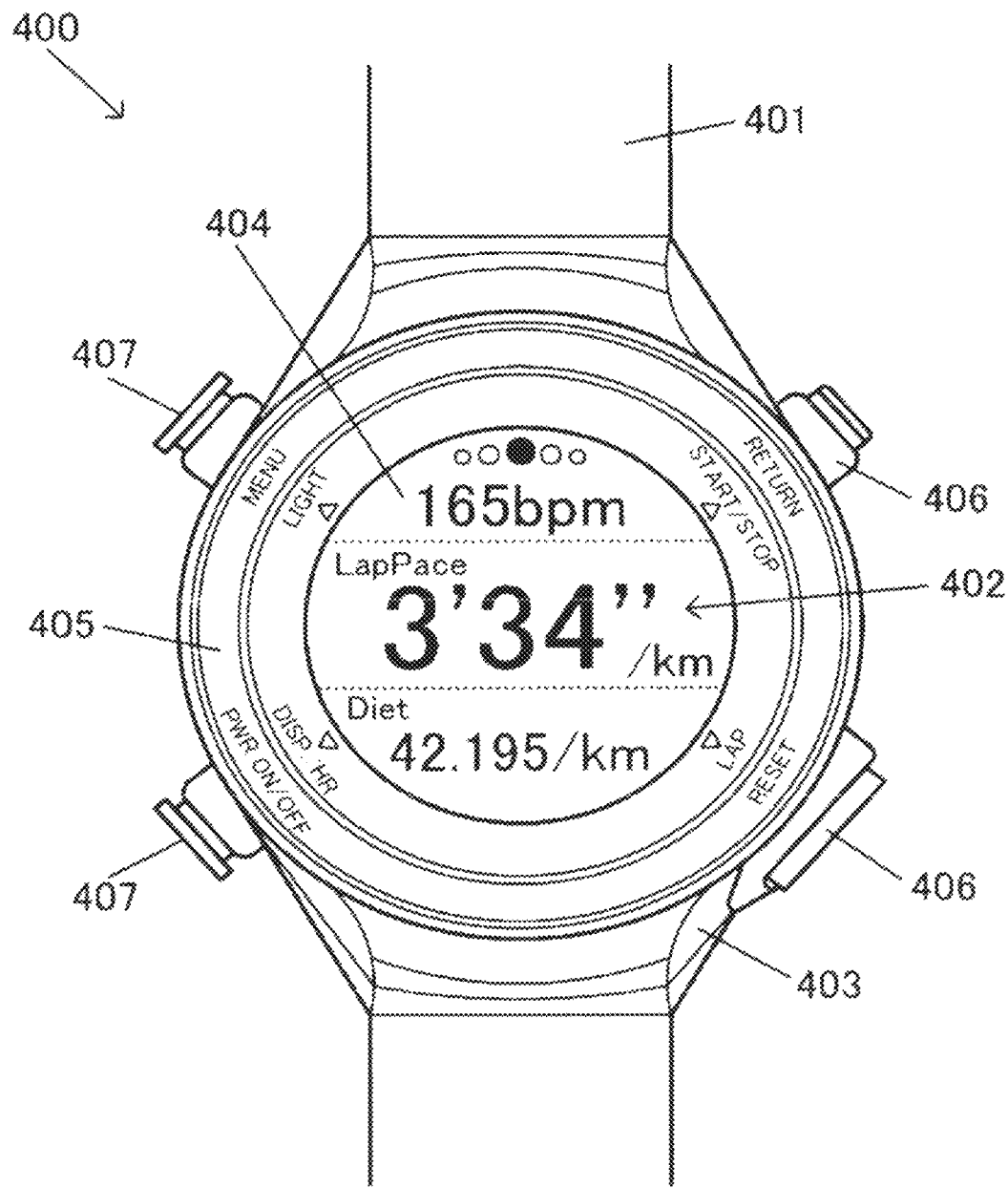
FIG. 9 is a plan view illustrating a wrist watch-type activity meter as a portable type electronic device.
Figure 10:
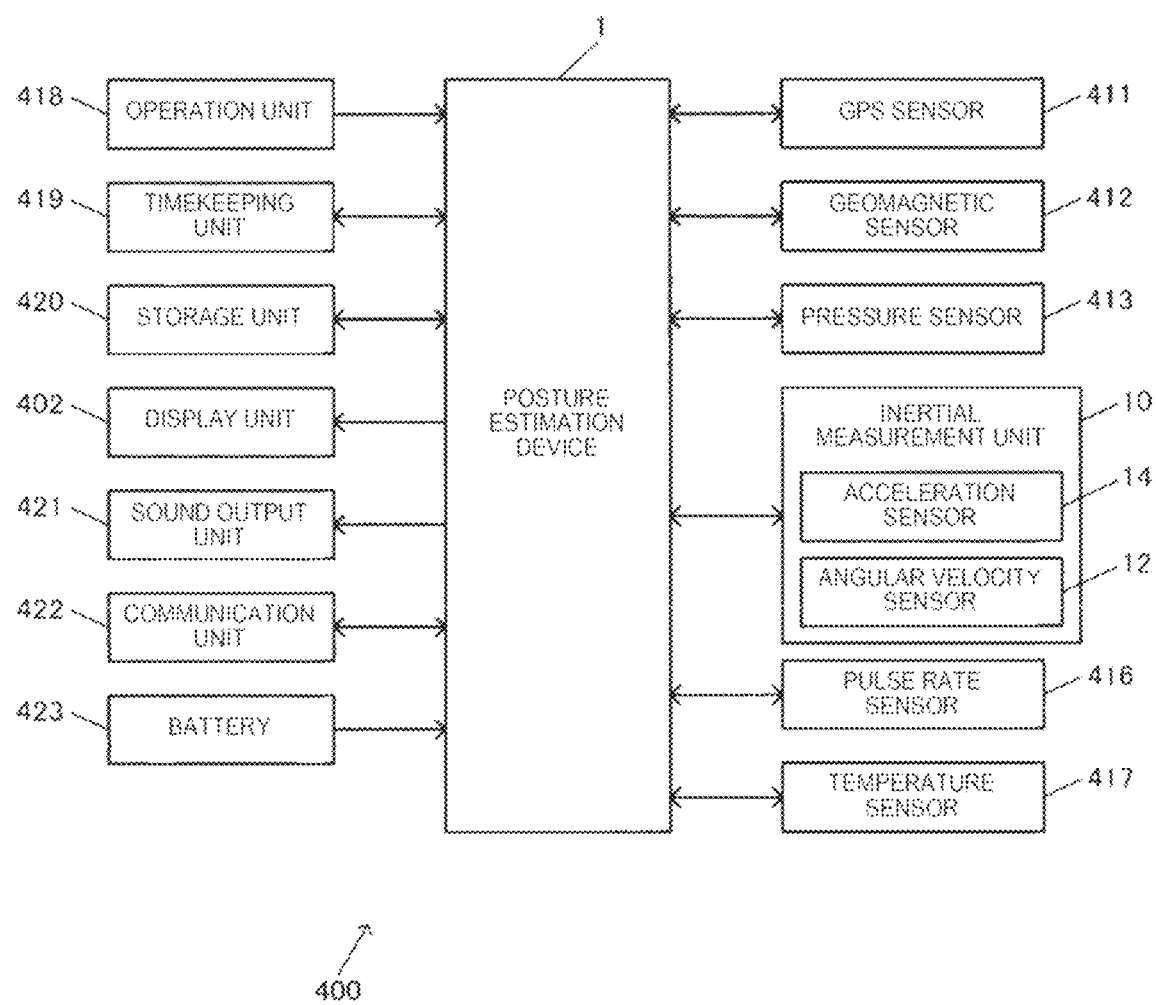
FIG. 10 is a block diagram illustrating an example of a configuration of the wrist watch-type activity meter as the portable type electronic device.

FIG. 9 is a plan view illustrating a wrist-watch type activity meter 400 as a portable electronic device. FIG. 10 is a block diagram illustrating an example of a configuration of the activity meter 400. The activity meter 400 is put on the region (such as the wrist) of a user by a band 401. The activity meter 400 which is an active tracker includes a display unit 402 for digital display. The activity meter 400 can perform wireless communication by Bluetooth (registered trademark), Wi-Fi (registered trademark), or the like.

As illustrated in FIGS. 9 and 10, the activity meter 400 includes a case 403, the posture estimation device 1, the display unit 402, and a translucent cover 404. In the case 403, the inertial measurement unit 10 is accommodated. The posture estimation device 1 is accommodated in the case 403 and performs processing based on an output signal from the inertial measurement unit 10. The display unit 402 is accommodated in the case 403. The translucent cover 404 closes an opening portion of the case 403. A bezel 405 is provided on the outside of the translucent cover 404. A plurality of operation buttons 406 and 407 are provided on a side surface of the case 403. The acceleration sensor 14 that detects a three-axis acceleration and the angular velocity sensor 12 that detects a three-axis angular velocity are provided in the inertial measurement unit 10.

In the display unit 402, position information or the movement amount obtained by a GPS sensor 411 or a geomagnetic sensor 412, motion information (such as a momentum) obtained by the acceleration sensor 14 or the angular velocity sensor 12, biometric information (such as a pulse rate) obtained by a pulse rate sensor 416, and time point information such as the current time point are displayed in accordance with various detection modes. An environmental temperature obtained by a temperature sensor 417 can also be displayed. The communication unit 422 communicates with an information terminal such as a user terminal. The posture estimation device 1 is realized by an MPU, a DSP, and an ASIC, for example. The posture estimation device 1 performs various types of processing based on programs stored in a storage unit 420 and information input by an operation unit 418 such as the operation buttons 406 and 407. The posture estimation device 1 performs processing of estimating posture information of the activity meter 400 based on the output signal of the inertial measurement unit 10. The posture estimation device 1 may perform processing based on output signals of the GPS sensor 411, the geomagnetic sensor 412, a pressure sensor 413, the acceleration sensor 14, the angular velocity sensor 12, the pulse rate sensor 416, the temperature sensor 417, and a timekeeping unit 419. The posture estimation device 1 can also perform display processing of displaying an image in the display unit 402, sound output processing of outputting sound to a sound output unit 421, communication processing of communicating with an information terminal via the communication unit 422, power control processing of supplying power from a battery 423 to the components, and the like.

According to the activity meter 400 having the above-described configuration in the embodiment, it is possible to exhibit the above-described effects of the posture estimation device 1 and to exhibit high reliability. The activity meter 400 includes the GPS sensor 411 and can measure the movement distance and a movement trajectory of the user. Thus, the activity meter 400 having high usability is obtained. The activity meter 400 can be widely applied to a running watch, a runner watch, an outdoor watch, a GPS watch equipped with a GPS, and the like.

5. Vehicle

In the embodiment, a vehicle includes the posture estimation device 1 in the above embodiment, and a control device that controls the posture of the vehicle based on the posture information of the vehicle, which has been estimated by the posture estimation device 1.

Figure 11:
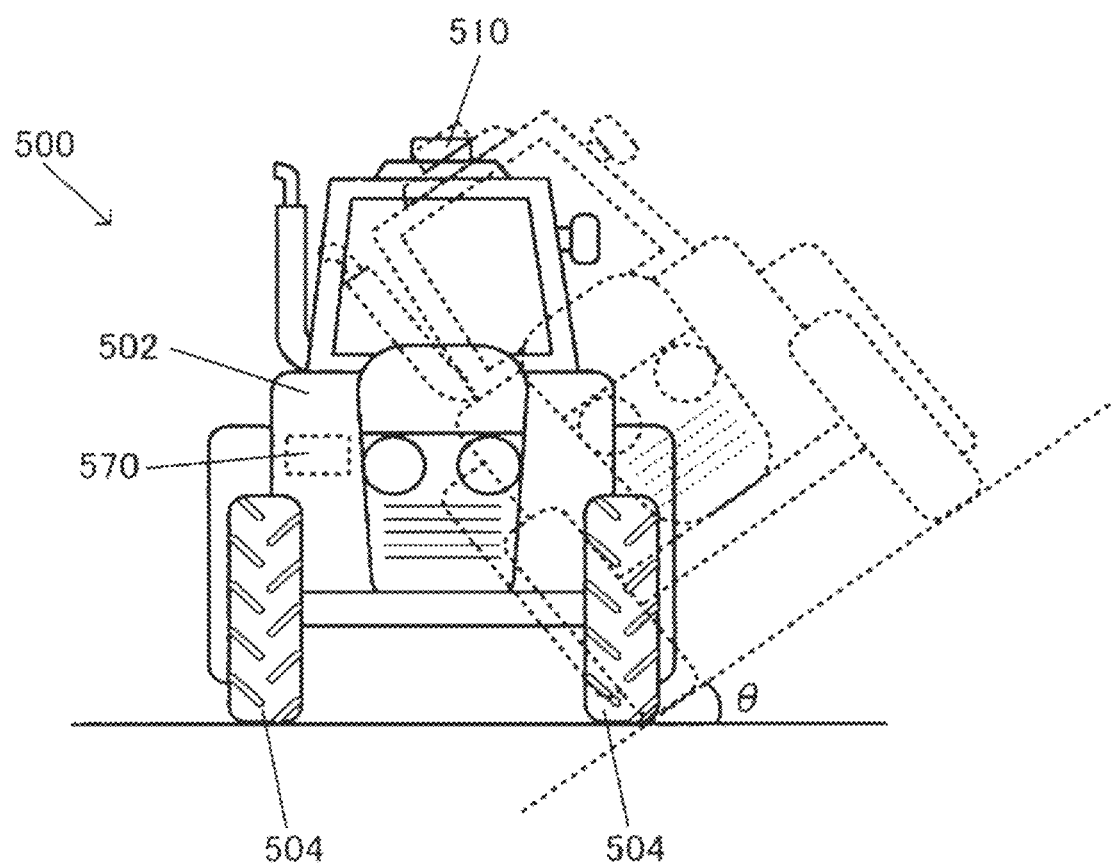
FIG. 11 illustrates an example of a vehicle in the embodiment.
Figure 12:
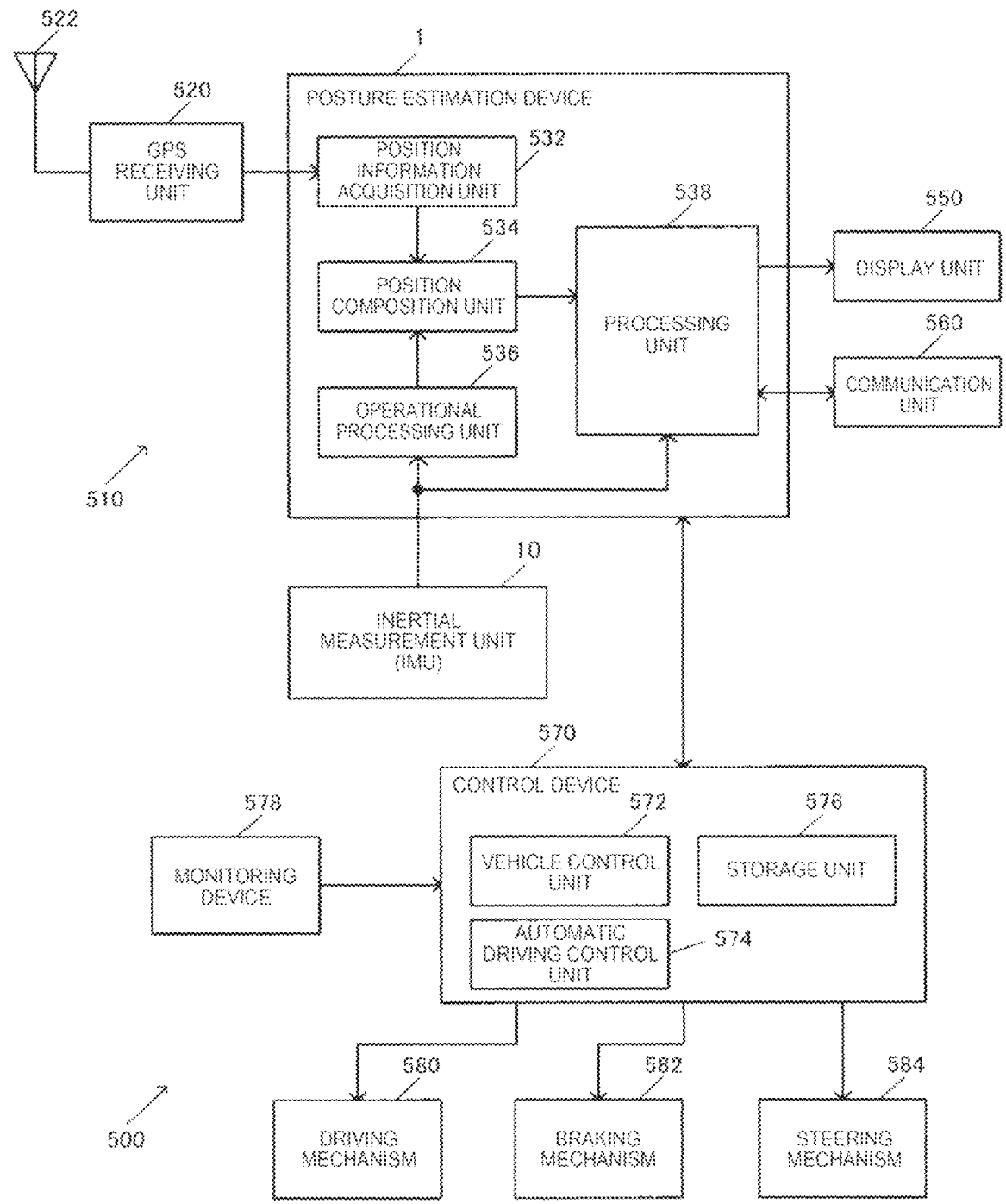
FIG. 12 is a block diagram illustrating an example of a configuration of the vehicle.

FIG. 11 illustrates an example of a vehicle 500. FIG. 12 is a block diagram illustrating an example of a configuration of the vehicle 500. As illustrated in FIG. 11, the vehicle 500 includes a vehicle body 502 and wheels 504. A positioning device 510 is mounted on the vehicle 500. A control device 570 that performs vehicle control and the like is provided in the vehicle 500. As illustrated in FIG. 12, the vehicle 500 includes a driving mechanism 580 such as an engine and a motor, a braking mechanism 582 such as a disk brake and a drum brake, and a steering mechanism 584 realized by a steering wheel, a steering gear box and the like. As described above, the vehicle 500 is equipment or a device that includes the driving mechanism 580, the braking mechanism 582, and the steering mechanism 584 and moves on the ground, in the sky, or in the sea. For example, the vehicle 500 is a four-wheel vehicle such as an agricultural machine.

The positioning device 510 is a device that is mounted on the vehicle 500 and performs positioning of the vehicle 500. The positioning device 510 includes the inertial measurement unit 10, a GPS receiving unit 520, an antenna 522 for GPS reception, and the posture estimation device 1. The posture estimation device 1 includes a position information acquisition unit 532, a position composition unit 534, an operational processing unit 536, and a processing unit 538. The inertial measurement unit 10 includes a three-axis acceleration sensor and a three-axis angular velocity sensor. The operational processing unit 536 receives acceleration data and angular velocity data from the acceleration sensor and the angular velocity sensor, performs inertial navigation operational processing on the received data, and outputs inertial navigation positioning data. The inertial navigation positioning data indicates the acceleration or the posture of the vehicle 500.

The GPS receiving unit 520 receives a signal from a GPS satellite via the antenna 522. The position information acquisition unit 532 outputs GPS positioning data based on a signal received by the GPS receiving unit 520. The GPS positioning data indicates the position, the speed, and the direction of the vehicle 500 on which the positioning device 510 is mounted. The position composition unit 534 calculates a position at which the vehicle 500 runs on the ground at the current time, based on the inertial navigation positioning data output from the operational processing unit 536 and the GPS positioning data output from the position information acquisition unit 532. For example, if the posture of the vehicle 500 differs by an influence of an inclination ($\theta$) of the ground and the like as illustrated in FIG. 11 even though the position of the vehicle 500, which is included in the GPS positioning data is the same, the vehicle 500 runs at a different position on the ground. Therefore, it is not possible to calculate the accurate position of the vehicle 500 only with the GPS positioning data. Thus, the position composition unit 534 calculates a position at which the vehicle 500 runs on the ground at the current time, by using data regarding the posture of the vehicle 500 among types of inertial navigation positioning data. Position data output from the position composition unit 534 is subjected to predetermined processing by the processing unit 538, and is displayed in a display unit 550, as a positioning result. The position data may be transmitted to an external device by a communication unit 560.

The control device 570 controls the driving mechanism 580, the braking mechanism 582, and the steering mechanism 584 of the vehicle 500. The control device 570 is a controller of controlling the vehicle. For example, the control device 570 can be realized by a plurality of control units. The control device 570 includes a vehicle control unit 572 being a control unit that controls the vehicle, an automatic driving control unit 574 being a control unit that controls automatic driving, and a storage unit 576 realized by a semiconductor memory and the like. A monitoring device 578 monitors an object such as an obstacle around the vehicle 500. The monitoring device 578 is realized by a surrounding monitoring camera, a millimeter wave radar, a sonar or the like.

As illustrated in FIG. 12, the vehicle 500 in the embodiment includes the posture estimation device 1 and the control device 570. The control device 570 controls the posture of the vehicle 500 based on posture information of the vehicle 500, which has been estimated by the posture estimation device 1. For example, the posture estimation device 1 performs various types of processing as described above, based on an output signal including detection data from the inertial measurement unit 10, so as to obtain information of the position or the posture of the vehicle 500. For example, the posture estimation device 1 can obtain information of the position of the vehicle 500 based on the GPS positioning data and the inertial navigation positioning data as described above. The posture estimation device 1 can estimate information of the posture of the vehicle 500 based on angular velocity data and the like included in the inertial navigation positioning data, for example. The information of the posture of the vehicle 500 can be represented by quaternion or by a roll angle, a pitch angle, and a yaw angle, for example. The control device 570 controls the posture of the vehicle 500 based on the posture information of the vehicle 500, which has been estimated by the processing of the posture estimation device 1. The control is performed by the vehicle control unit 572, for example. The control of the posture can be implemented by the control device 570 controlling the steering mechanism 584, for example. Alternatively, in control (such as slip control) for stabilizing the posture of the vehicle 500, the control device 570 may control the driving mechanism 580 or control the braking mechanism 582. According to the embodiment, with the posture estimation device 1, it is possible to estimate information of a posture with high accuracy. Accordingly, it is possible to realize appropriate posture control of the vehicle 500.

In the embodiment, the control device 570 controls at least one of accelerating, braking, and steering of the vehicle 500 based on information of the position and the posture of the vehicle 500, which has been obtained by the posture estimation device 1. For example, the control device 570 controls at least one of the driving mechanism 580, the braking mechanism 582, and the steering mechanism 584 based on the information of the position and the posture of the vehicle 500. Thus, for example, it is possible to realize automatic driving control of the vehicle 500 by the automatic driving control unit 574. In the automatic driving control, a monitoring result of a surrounding object by the monitoring device 578, map information or running route information stored in the storage unit 576, and the like are used in addition to the information of the position and the posture of the vehicle 500. The control device 570 switches the execution or non-execution of the automatic driving of the vehicle 500 based on a monitoring result of the output signal of the inertial measurement unit 10. For example, the posture estimation device 1 monitors the output signal such as detection data from the inertial measurement unit 10. When a decrease of detection accuracy of the inertial measurement unit 10 or a sensing problem is detected based on the monitoring result, for example, the control device 570 performs switching from the execution of the automatic driving to the non-execution of the automatic driving. For example, in the automatic driving, at least one of accelerating, braking, and steering of the vehicle 500 is automatically controlled. When the automatic driving is not executed, such automatic control of accelerating, braking, and steering is not performed. In this manner, an assistance having higher reliability in running of the vehicle 500 that performs automatic driving is possible. An automation level of the automatic driving may be switched based on the monitoring result of the output signal of the inertial measurement unit 10.

Figure 13:
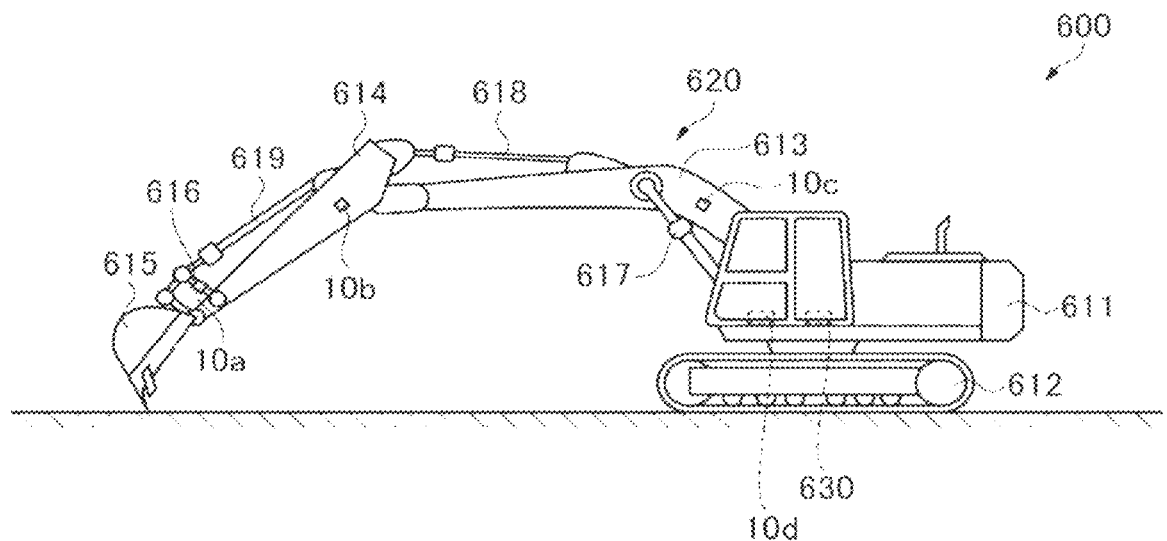
FIG. 13 illustrates another example of the vehicle in the embodiment.
Figure 14:
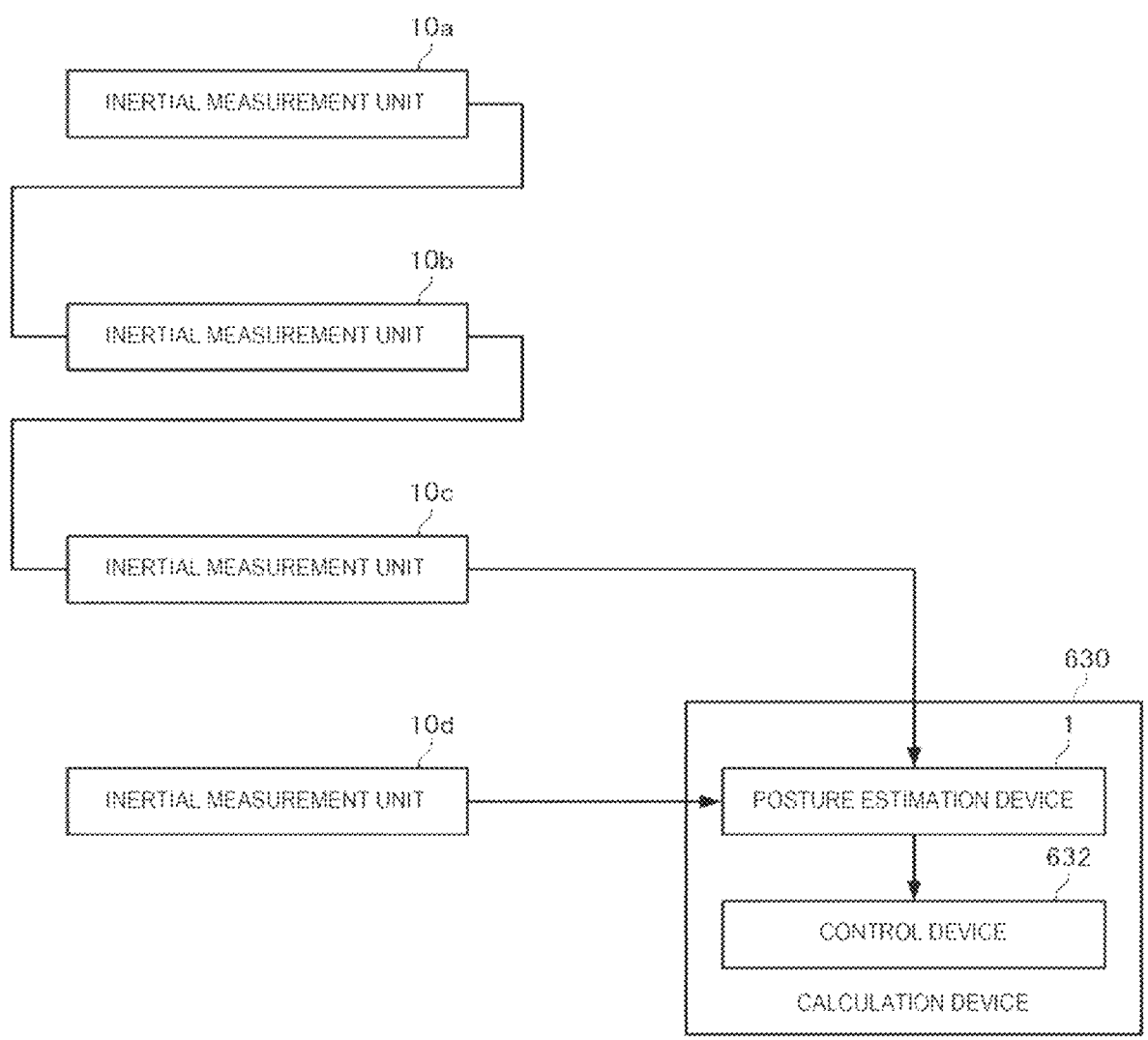
FIG. 14 is a block diagram illustrating an example of a configuration of the vehicle.

FIG. 13 illustrates an example of another vehicle 600. FIG. 14 is a block diagram illustrating an example of a configuration of the vehicle 600. The posture estimation device 1 in the embodiment can be effectively used in posture control and the like of a construction machine. FIGS. 13 and 14 illustrate a hydraulic shovel being an example of the construction machine as the vehicle 600.

As illustrated in FIG. 13, in the vehicle 600, a vehicle body is constituted by a lower running body 612 and an upper revolving body 611, and a work mechanism 620 is provided in the front of the upper revolving body 611. The upper revolving body 611 is mounted to be capable of revolving on the lower running body 612. The work mechanism 620 is constituted by a plurality of members capable of pivoting in an up-and-down direction. A driver seat (not illustrated) is provided in the upper revolving body 611. An operation device (not illustrated) that operates the members constituting the work mechanism 620 is provided on the driver seat. An inertial measurement unit 10d functioning as an inclination sensor that detects an inclination angle of the upper revolving body 611 is disposed in the upper revolving body 611.

The work mechanism 620 includes a boom 613, an arm 614, a bucket link 616, a bucket 615, a boom cylinder 617, an arm cylinder 618, and a bucket cylinder 619, as the plurality of members. The boom 613 is attached to the front portion of the upper revolving body 611 to be capable of elevating. The arm 614 is attached to the tip of the boom 613 to be capable of elevating. The bucket link 616 is attached to the tip of the arm 614 to be rotatable. The bucket 615 is attached to the tip of the arm 614 and the bucket link 616 to be rotatable. The boom cylinder 617 drives the boom 613. The arm cylinder 618 drives the arm 614. The bucket cylinder 619 drives the bucket 615 through the bucket link 616.

The base end of the boom 613 is supported by the upper revolving body 611 to be rotatable in the up-and-down direction. The boom 613 is rotationally driven relative to the upper revolving body 611 by expansion and contraction of the boom cylinder 617. An inertial measurement unit 10c functioning as an inertial sensor that detects the motion state of the boom 613 is disposed in the boom 613.

One end of the arm 614 is supported by the tip of the boom 613 to be rotatable. The arm 614 is rotationally driven relative to the boom 613 by expansion and contraction of the arm cylinder 618. An inertial measurement unit 10b functioning as an inertial sensor that detects the motion state of the arm 614 is disposed in the arm 614.

The bucket link 616 and the bucket 615 are supported by the tip of the arm 614 to be rotatable. The bucket link 616 is rotationally driven relative to the arm 614 by expansion and contraction of the bucket cylinder 619. The bucket 615 is rotationally driven relative to the arm 614 with the bucket link 616 driven. An inertial measurement unit 10a functioning as an inertial sensor that detects the motion state of the bucket link 616 is disposed in the bucket link 616.

Here, the inertial measurement unit 10 described in the above embodiment can be used as the inertial measurement units 10a, 10b, 10c, and 10d. The inertial measurement units 10a, 10b, 10c, and 10d can detect at least any of an angular velocity and an acceleration acting on the members of the work mechanism 620 or the upper revolving body 611. As illustrated in FIG. 14, the inertial measurement units 10a, 10b, and 10c are coupled in series and can transmit a detection signal to a calculation device 630. As described above, since the inertial measurement units 10a, 10b, and 10c are coupled in series, it is possible to reduce the number of wires for transmitting a detection signal in a movable region and to obtain a compact wiring structure. With the compact wiring structure, it is easy to select a method of laying the wire, and it is possible to reduce an occurrence of deteriorating or damaging the wire, for example.

Further, as illustrated in FIG. 13, the calculation device 630 is provided in the vehicle 600. The calculation device 630 calculates an inclination angle of the upper revolving body 611 or the positions or postures of the boom 613, the arm 614, and the bucket 615 constituting the work mechanism 620. As illustrated in FIG. 14, the calculation device 630 includes the posture estimation device 1 in the above embodiment and a control device 632. The posture estimation device 1 estimates posture information of the vehicle 600 based on an output signal of the inertial measurement units 10a, 10b, 10c, and 10d. The control device 632 controls the posture of the vehicle 600 based on the posture information of the vehicle 600, which has been estimated by the posture estimation device 1. Specifically, the calculation device 630 receives various detection signals input from the inertial measurement units 10a, 10b, 10c, and 10d and calculates the positions and postures (posture angles) of the boom 613, the arm 614, and the bucket 615 or an inclination state of the upper revolving body 611 based on the various detection signals. The calculated position-and-posture signal including a posture angle of the boom 613, the arm 614, or the bucket 615 or an inclination signal including a posture angle of the upper revolving body 611, for example, the position-and-posture signal of the bucket 615 is used in feedback information for a display of a monitoring device (not illustrated) on the driver seat or for controlling an operation of the work mechanism 620 or the upper revolving body 611.

As the construction machine in which the posture estimation device 1 in the above embodiment is used, for example, a rough terrain crane (crane car), a bulldozer, an excavator/loader, a wheel loader, and an aerial work vehicle (lift car) is provided in addition to the hydraulic shovel (jumbo, back hoe, and power shovel) exemplified above.

According to the embodiment, with the posture estimation device 1, it is possible to obtain information of a posture with high accuracy. Thus, it is possible to realize appropriate posture control of the vehicle 600. According to the vehicle 600, since the compact inertial measurement unit 10 is mounted, it is possible to provide a construction machine in which a plurality of inertial measurement units can be compactly disposed at installation sites of the inertial measurement units 10 by serial coupling (multi-coupling), or cable routing of coupling the inertial measurement units 10 installed at the sites to each other in series by a cable can be compactly performed, even in a very narrow region such as the bucket link 616.

In the embodiment, descriptions are made by using the four-wheel vehicle such as the agricultural machine and the construction machine as an example of the vehicle in which the posture estimation device 1 is used. However, in addition, motorcycles, bicycles, trains, airplanes, biped robots, remote-controlled or autonomous aircraft (such as radio-controlled aircraft, radio-controlled helicopters and drones), rockets, satellites, ships, automated guided vehicles (AGVs) are provided.

The present disclosure is not limited to the embodiment, and various modifications can be made in a range of the gist of the present disclosure.

The above-described embodiment and modification examples are examples, and the present disclosure is not limited thereto. For example, the embodiment and the modification examples can be appropriately combined.

The present disclosure includes a configuration which is substantially the same as the configuration described in the embodiment (for example, configuration having the same function, method, and result or configuration having the same purpose and effect). The present disclosure includes a configuration in which the not-essential component in the configuration described in the embodiment has been replaced. The present disclosure includes a configuration of exhibiting the same effects as those in the configuration described in the embodiment or a configuration capable of achieving the same purpose. The present disclosure includes a configuration in which a known technique is added to the configuration described in the embodiment.

What is claimed is:

1. A posture estimation method comprising:
calculating a posture change amount of an object based on an output of an angular velocity sensor;
predicting posture information of the object by using the posture change amount;
limiting an azimuth error around a reference vector, in error information; and
correcting the predicted posture information of the object based on the error information, the reference vector, and an output of a reference observation sensor.

2. The posture estimation method according to claim 1, wherein
the limiting of the azimuth error includes
determining whether or not the azimuth error component exceeds an upper limit, and
limiting the azimuth error component when the bias error component exceeds the upper limit.

3. The posture estimation method according to claim 1, wherein
the reference observation sensor is a star tracker, and
the reference vector is a vector which is directed from the object toward a fixed star and is observed by the star tracker.

4. A posture estimation device comprising:
a posture-change-amount calculation unit that calculates a posture change amount of an object based on an output of an angular velocity sensor;
a posture information prediction unit that predicts posture information of the object by using the posture change amount;
an error information update unit that updates error information based on the output of the angular velocity sensor;
a azimuth error limitation unit that limits a azimuth error around a reference vector, in the error information; and
a posture information correction unit that corrects the predicted posture information of the object based on the error information, the reference vector, and an output of a reference observation sensor.

5. A vehicle comprising:
the posture estimation device according to claim 4; and
a control device that controls a posture of the vehicle based on posture information of the vehicle, which is estimated by the posture estimation device.

* * * * *